United States Patent
Kimura

(10) Patent No.: US 11,907,593 B2
(45) Date of Patent: Feb. 20, 2024

(54) PRINTING SYSTEM, INSPECTION METHOD, AND MEDIUM

(71) Applicant: CANON KABUSHIKI KAISHA, Tokyo (JP)

(72) Inventor: Yusuke Kimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/332,404

(22) Filed: May 27, 2021

(65) Prior Publication Data

US 2021/0382669 A1    Dec. 9, 2021

(30) Foreign Application Priority Data

Jun. 4, 2020   (JP) ................................. 2020-097833

(51) Int. Cl.
*G06F 3/12*    (2006.01)
*G06T 7/00*    (2017.01)

(52) U.S. Cl.
CPC ............ *G06F 3/1234* (2013.01); *G06F 3/121* (2013.01); *G06T 7/001* (2013.01); *G06T 2207/30144* (2013.01)

(58) Field of Classification Search
CPC ....... G06F 3/1234; G06F 3/121; G06T 7/001; G06T 2207/30144
USPC ..... 358/1.9, 1.12, 3.24, 1.14, 1.18; 382/141, 382/112
See application file for complete search history.

(56) References Cited

U.S. PATENT DOCUMENTS

| | | | |
|---|---|---|---|
| 5,684,934 A | * 11/1997 | Chen | ...................... G06F 3/125 358/1.14 |
| 2005/0000842 A1 | * 1/2005 | Timmerman | ............ B26D 5/32 53/399 |
| 2011/0129239 A1 | * 6/2011 | Kubota | ................ G03G 15/655 399/16 |
| 2011/0211007 A1 | * 9/2011 | Okamoto | ............... B41J 11/006 347/16 |
| 2011/0299862 A1 | 12/2011 | Kozuka | |
| 2012/0268771 A1 | * 10/2012 | Kruizinga | .......... H04N 1/32657 358/1.14 |
| 2013/0235411 A1 | * 9/2013 | Oba | .................... G06K 15/4085 358/1.14 |
| 2018/0059603 A1 | 3/2018 | Miyahara | |

(Continued)

FOREIGN PATENT DOCUMENTS

| CN | 1862402 A | 11/2006 |
|---|---|---|
| CN | 103869673 A | 6/2014 |

(Continued)

*Primary Examiner* — Jamares Q Washington
(74) *Attorney, Agent, or Firm* — Canon U.S.A., Inc. IP Division

(57) ABSTRACT

A printing system is provided. The system comprises a printing unit for forming an image on a sheet transported along a transport path; an inspection unit for inspecting an image formed on the sheet transported along the transport path by comparing the image with a reference image, and for recording order information of sheets that have been inspected and order information of sheets that have been correctly discharged; and a control unit for, when a jam occurs in the transport path of the sheet, controlling the inspection unit to resume inspection, after printing resumes, from a first sheet recorded as not yet having been inspected or not correctly discharged.

15 Claims, 19 Drawing Sheets

(56) References Cited

U.S. PATENT DOCUMENTS

2018/0157446 A1    6/2018  Fukuda
2021/0321007 A1*  10/2021  Ito ........................ G06T 7/0002

FOREIGN PATENT DOCUMENTS

| JP | 2014153560 A  | 8/2014 |
| JP | 2015104853 A  | 6/2015 |
| JP | 2018-031963 A | 3/2018 |

* cited by examiner

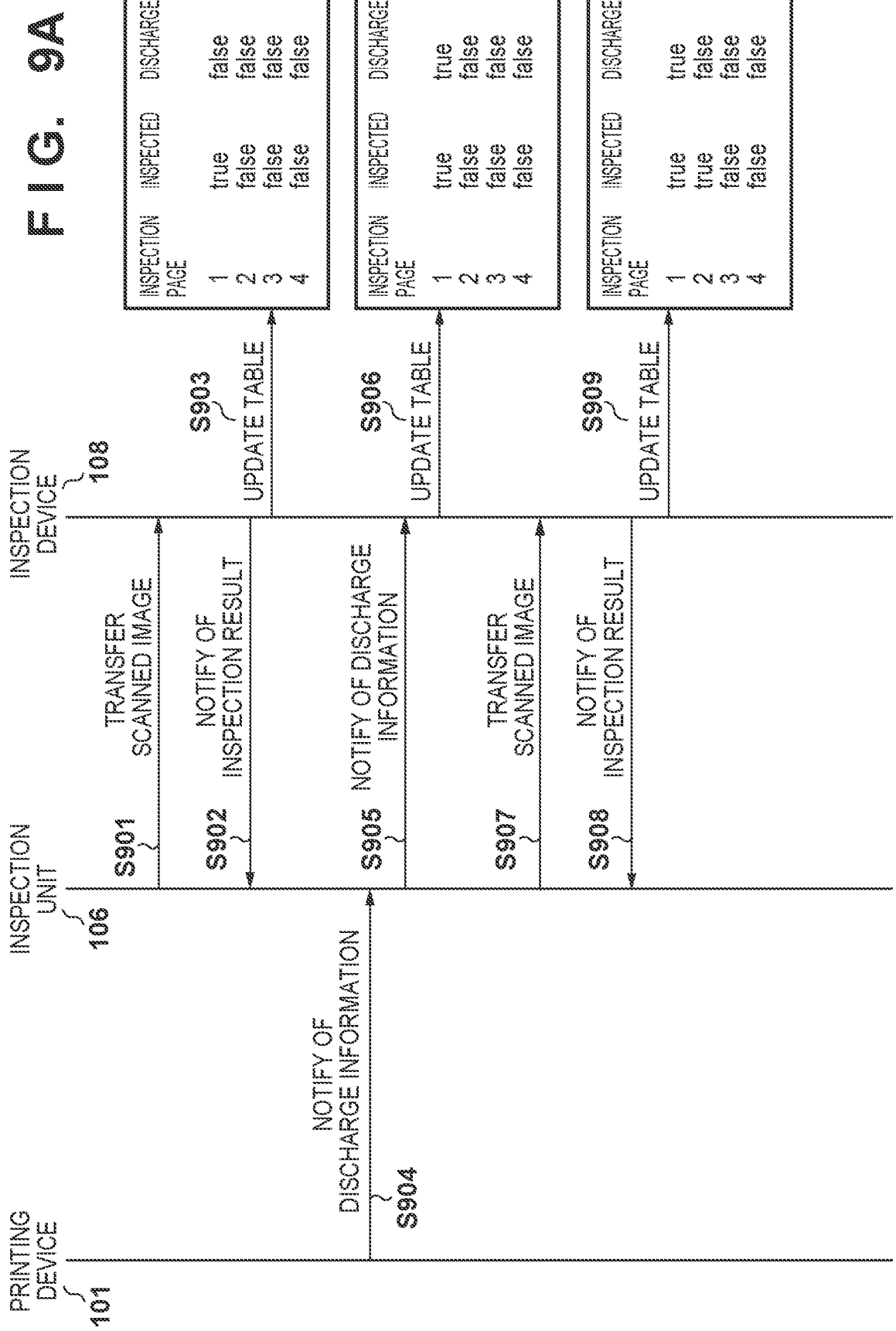

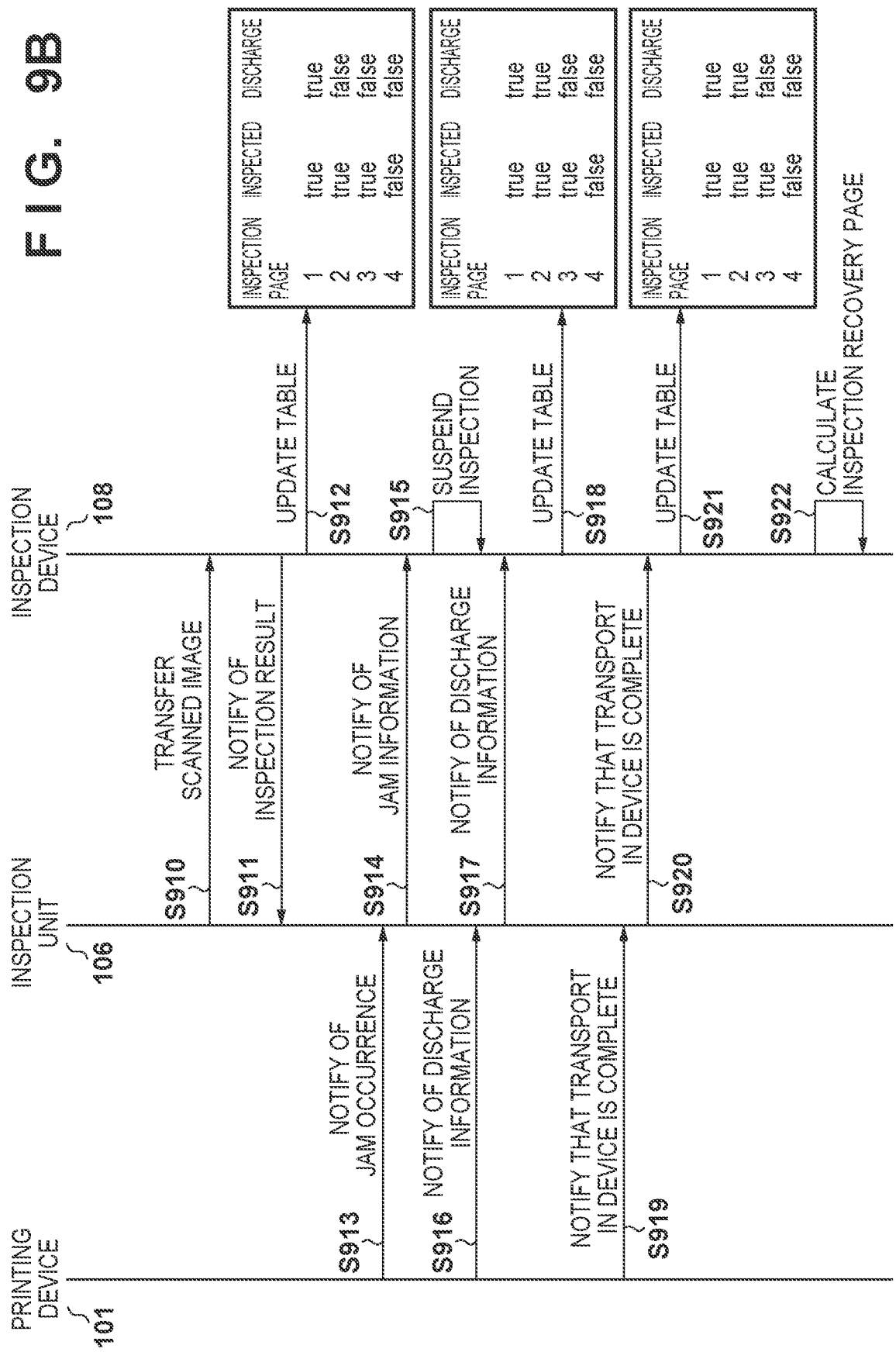

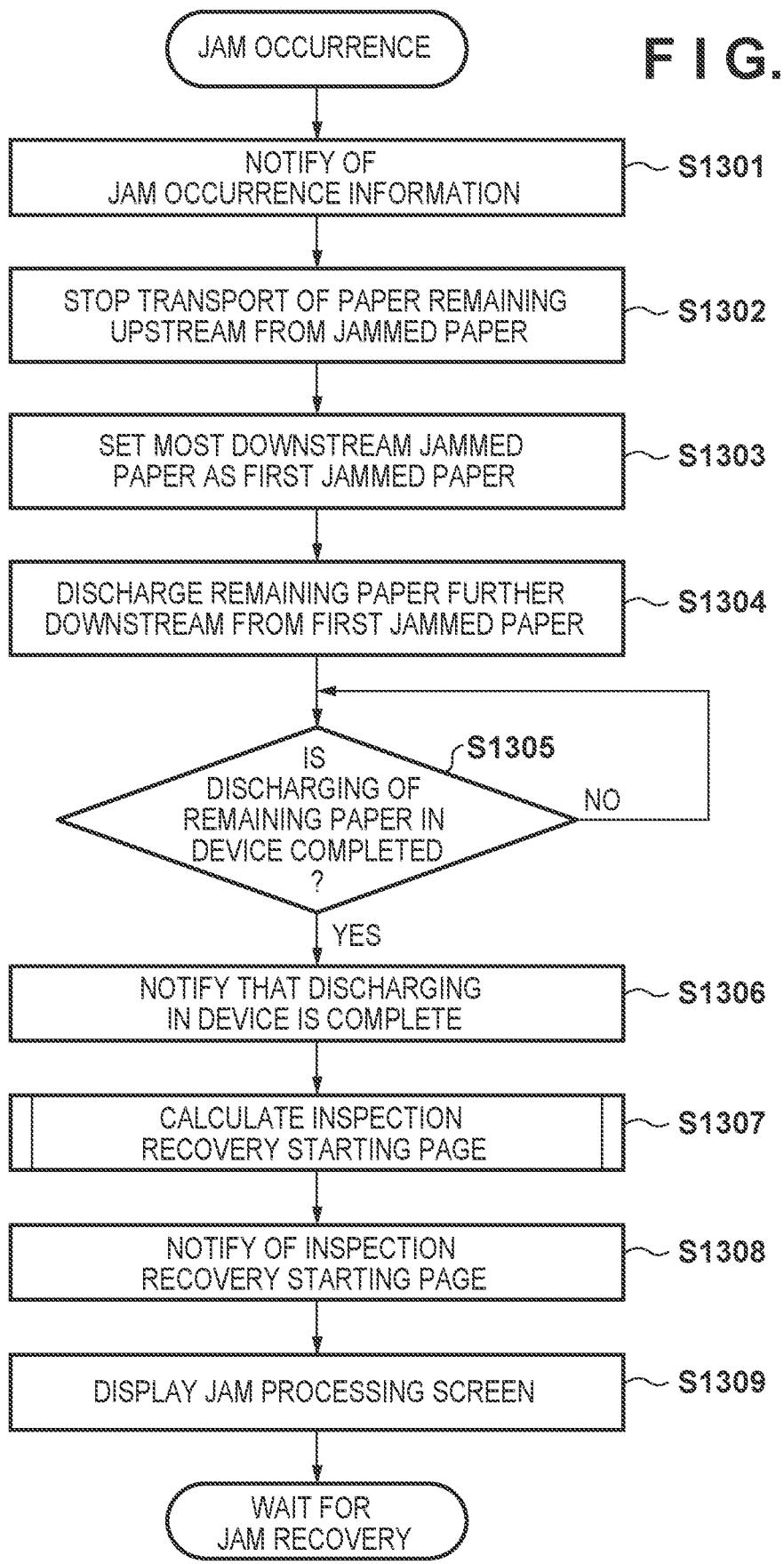

PRINTING SYSTEM, INSPECTION METHOD, AND MEDIUM

BACKGROUND OF THE INVENTION

Field of the Invention

The present invention relates to a printing system, an inspection method, and a medium for inspecting the quality of printed material.

Description of the Related Art

An inspection device is known which reads printed materials printed by a printing device and inspects the quality of the printed material. The inspection device is capable of detecting image defects such as soiling and missing prints, text errors, barcode quality, and the like. A finished product in which such defects have been detected is separated from non-defective printed materials by, for example, changing the discharge destination.

When a sheet being transported is inspected by an inspection unit provided in a sheet transport path that transports the sheet, a sheet jam may occur in the sheet transport path downstream from the inspection unit in the sheet transport direction (hereinafter simply referred to as the "downstream side"). In this case, a sheet for which the inspection has been determined to be correct by the inspection device is the jammed paper. Because the image printed on the jammed paper is printed again through jam recovery processing, the inspection by the inspection device is also performed again. Depending on the location of the jam, a sheet with the same printed content may be inspected twice, which results in the inspection being performed with a reference image and a captured image in a misaligned state, and the sheet being determined to be defective. There is a problem in that when a jam occurs, it is necessary for a user to check the jammed paper which has been removed and the image on the final sheet on the discharge tray to determine whether or not it is necessary to set a reinspection starting page for the sheet inspection device, and this complicates the jam processing operations.

To avoid such a problem, rather than automatically starting the jam recovery processing after the jammed paper has been removed, it is conceivable to wait for an instruction from the user and start the jam recovery process on the basis of the instruction from the user. For example, a technique has been disclosed in which a setting screen for the reinspection starting page is displayed only when the reinspection starting page needs to be set, and printing is resumed in response to a resume instruction from the user (Japanese Patent Laid-Open No. 2018-31963).

SUMMARY OF THE INVENTION

However, in this prior art, after removing the jammed paper, it is necessary for the user to manually identify and input the reinspection starting page. There is thus a problem in that it is troublesome to resume the inspection process when a jam occurs.

The present invention makes it possible for an inspection device to identify an inspection recovery starting page by taking into account not only jam occurrence information, but also paper transport information, in determination conditions.

The present invention has the following configuration.

The present invention in its first aspect provides a printing system comprising: a printing unit configured to form an image on a sheet transported along a transport path; an inspection unit configured to inspect the image formed on the sheet transported along the transport path by comparing the image with a reference image, and record order information of sheets that have been inspected and order information of sheets that have been correctly discharged; and a control unit configured to, when a jam occurs in the transport path of the sheet, control the inspection unit to resume inspection, after printing resumes, from a first sheet recorded as not yet having been inspected or not correctly discharged.

The present invention in its second aspect provides an inspection method of inspecting an image formed on a sheet transported along a transport path, the method comprising: inspecting the image formed on the sheet being transported along the transport path by comparing the image with a reference image; recording order information of sheets that have been inspected and order information of sheets that have been correctly discharged; and when a jam occurs in the transport path of the sheet, resuming inspection, after printing resumes, from a first sheet recorded as not yet having been inspected or not correctly discharged.

The present invention in its third aspect provides a non-transitory computer-readable medium that stores a program that, when executed by a computer, causes the computer to carry out an inspection method of inspecting an image formed on a sheet transported along a transport path, the method comprising: inspecting the image formed on the sheet being transported along the transport path by comparing the image with a reference image; recording order information of sheets that have been inspected and order information of sheets that have been correctly discharged; and when a jam occurs in the transport path of the sheet, resuming inspection, after printing resumes, from a first sheet recorded as not yet having been inspected or not correctly discharged.

According to the present invention, an inspection device can identify an inspection recovery starting page, and a user can resume printing without having to set the starting page to use when the inspection resumes. This makes it possible to eliminate the problem of it being troublesome to resume the inspection process when a jam occurs, and makes it possible to improve the productivity of printing operations.

Further features of the present invention will become apparent from the following description of embodiments with reference to the attached drawings.

BRIEF DESCRIPTION OF THE DRAWINGS

FIG. 9A is a timing chart for the inspection device and the inspection unit according to the first embodiment.

FIG. 9B is a timing chart for the inspection device and the inspection unit according to the first embodiment.

FIG. 13 is a flowchart illustrating basic operations of the printing device and the inspection unit during inspection, according to the third embodiment.

DESCRIPTION OF THE EMBODIMENTS

Figure 1:
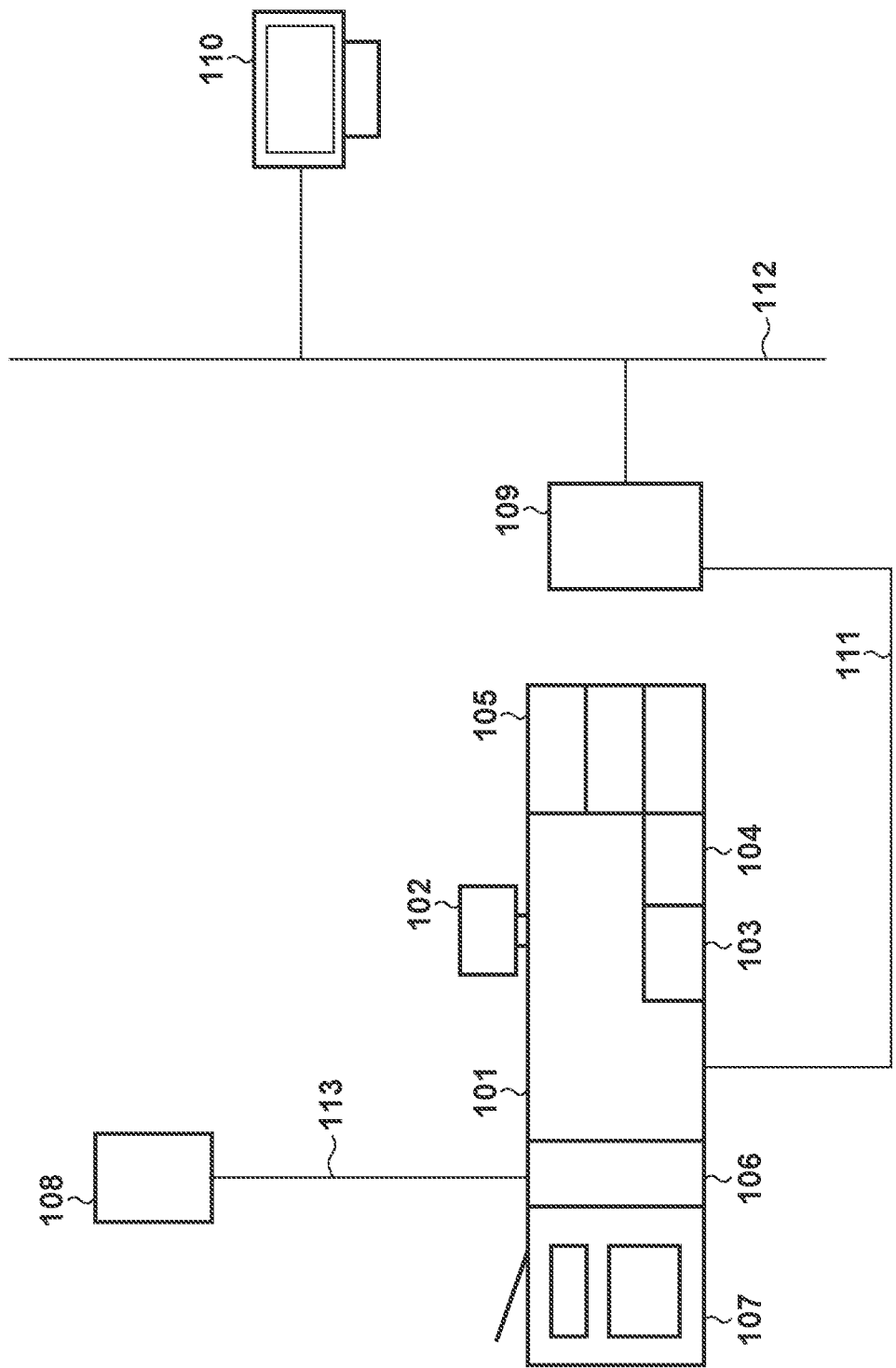
FIG. 1 is a schematic diagram illustrating the configuration of an information processing device, an inspection device, and a printing device according to embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

It goes without saying that unless otherwise specified, the present invention can be applied in an inspection device that is a standalone device or is configured of a plurality of devices, as long as the functions according to the present invention are realized. If the functions of the present invention are realized, the present invention can also be applied in an inspection device that is connected to and performs processing through a network such as a LAN (Local Area Network) or WAN (Wide Area Network). In other words, a system configuration in which the various types of terminals described in the following embodiments are connected is merely one example, and it goes without saying that a variety of configuration examples are possible depending on the application, purpose, and the like. Before describing each embodiment, configurations, sequences, and the like that are common to all the embodiments will be described.

Apparatus Configuration

FIG. 1 is a schematic diagram illustrating an image forming system (also referred to as a printed material inspection system) constituted by an information processing device, an inspection device, and a printing device according to the present embodiment. Although the printing device according to the present embodiment is described using an electrophotographic-type printing device, the printing device according to the present embodiment may be a printing device that uses a different image forming method, such as an inkjet method or an offset method.

A printing device 101 (printing unit) is connected to an information processing device 109 by a cable 111. The information processing device 109 is connected to a client computer 110 and an inspection device (inspection execution unit) 108 over a network 112.

The printing device 101 includes a user interface (UI) panel 102, a paper feed deck 103, and a paper feed deck 104. An optional deck 105 constituted by three paper feed decks is also connected. The printing device 101 is, for example, an electrophotographic-type printing device. The UI panel 102 is a user interface including, for example, a capacitive touch panel.

The printing device 101 also includes an inspection unit (obtainment unit) 106 and a large-capacity stacker 107. The inspection unit 106 is connected to the inspection device 108 by a cable 113, and the inspection unit 106 and the inspection device 108 together comprise the image inspection unit (or means). The large-capacity stacker 107 includes a main tray and a top tray, and the main tray can hold a stack of several thousand sheets of paper at a time. Note that in the present embodiment, the term "sheet" may be taken to have the same meaning as "paper". The inspection device 108 and the inspection unit 106 may also be referred to collectively as an "inspection device". In this example, the inspection unit 106 obtains an image formed on a sheet using a scanner. The inspection device 108 corresponds to an inspection execution unit that inspects an image on the basis of the obtained image and a reference image.

A print job is generated by the client computer 110, sent to the information processing device 109 over the network 112, and managed by the information processing device 109. Then, the print job is sent from the information processing device 109 to the printing device 101 through the cable 111, and the printing device 101 performs processing for printing onto paper.

Note that the client computer 110, the information processing device 109, and the inspection device 108 may be connected to the cable 111 and capable of communicating with the printing device 101. In other words, the connection format of the printing device 101, the information processing device 109, and the client computer 110 described in the present embodiment is merely an example, and it goes without saying that a variety of connection formats aside from that described in the present embodiment are possible.

Figure 2:
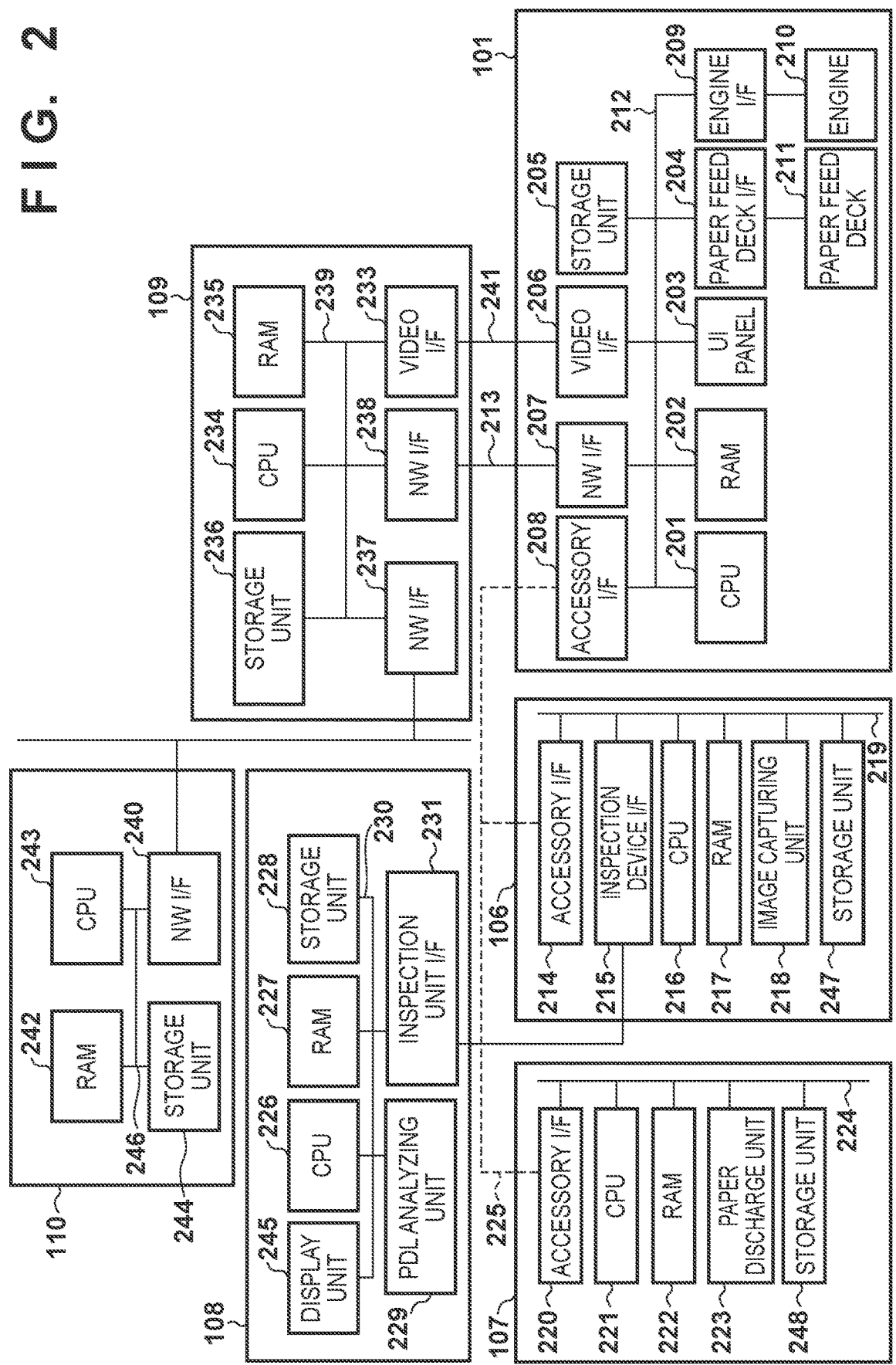
FIG. 2 is a block diagram illustrating the configuration of the information processing device, the inspection device, and the printing device according to embodiments.

FIG. 2 is a block diagram illustrating a control configuration of the printing device 101, the inspection unit 106, the inspection device 108, the large-capacity stacker 107, the information processing device 109, and the client computer 110 according to the present embodiment.

In the printing device 101, a CPU (Central Processing Unit) 201 controls and performs calculations for each of units within the printing device 101, via a system bus 212. The CPU 201 handles the execution of programs stored in a storage unit 205 and loaded into RAM (Random Access Memory) 202. The RAM 202 is a typical type of volatile storage device which can be directly accessed by the CPU 201, and is used as a work area or another temporary data storage area for the CPU 201. The storage unit 205 functions as a temporary storage area and work memory when the printing device is operating.

An engine I/F 209 communicates with and controls a printer engine 210. A paper feed deck I/F 204 communicates with and control a paper feed deck 211. "Paper feed deck 211" is a collective name for paper feed decks 103 and 104 and the optional deck 105 as hardware configurations. A UI panel 203 is the hardware configuration of the UI panel 102, and is a user interface for performing overall operations of the printing device 101. The present embodiment assumes that the UI panel 203 is a capacitive touch panel.

A network interface ("NW I/F" hereinafter) 207 is connected to an NW I/F 238 of the information processing device 109 by a cable 213, and handles communication between the information processing device 109 and the printing device 101. Although this example describes the interfaces connected to system buses 212 and 239 as being connected to each other directly, the information processing device 109 and the printing device 101 may, for example, be connected over a network, and the connection format is not limited. A video I/F 206 is connected to a video I/F 233 by a video cable 241, and handles the communication of image data between the information processing device 109 and the printing device 101.

Note that the connection interface with the printing device 101 in the information processing device 109 may be in a form in which the functions of the NW I/F 238 and the video I/F 233 are integrated. Likewise, the connection interface with the information processing device 109 in the printing device 101 may be in a form in which the functions of the NW I/F 207 and the video I/F 206 are integrated.

An accessory I/F 208 is connected to an accessory I/F 214 and an accessory I/F 220 by a cable 225. In other words, the printing device 101 communicates with the inspection unit 106 and the large-capacity stacker 107 via the accessory I/Fs 208, 214, and 220.

In the inspection unit 106, a CPU 216 controls and performs calculations for each unit within the inspection unit 106 via a system bus 219, and handles the execution of programs stored in a storage unit 247 and loaded into RAM 217. The RAM 217 is a typical type of volatile storage device which can be directly accessed by the CPU 216, and is used as a work area or another temporary data storage area for the CPU 216. The storage unit 247 functions as a temporary storage area and work memory when the inspection device is operating. An inspection device I/F 215 is connected to an inspection unit I/F 231 by a cable 248. In other words, the inspection unit 106 communicates with the inspection device 108 via the inspection device I/F 215 and the inspection unit I/F 231.

An image capturing unit 218 has an image capturing function using a contact image sensor ("CIS" hereinafter), for example, captures an image of paper passing through the inspection unit, and sends the captured image to the inspection device 108 via the inspection device I/F 215. Note that a CIS is merely one example of a sensor for the image capturing unit 218. Another type of sensor, such as a CCD image sensor, may be used, and the image capturing method is not limited.

In the large-capacity stacker 107, a CPU 221 controls and performs calculations for each unit within the large-capacity stacker 107 via a system bus 224, and handles the execution of programs stored in a storage unit 248 and loaded into RAM 222. The RAM 222 is a typical type of volatile storage device which can be directly accessed by the CPU 221, and is used as a work area or another temporary data storage area for the CPU 221. The storage unit 248 functions as a temporary storage area and work memory when the inspection device is operating. A paper discharge unit 223 handles the monitoring and control of operations for discharging paper to the main tray and the top tray, the loading states of the main tray and the top tray, and the like.

In the inspection device 108, a CPU 226 controls and performs calculations for each unit within the inspection device 108 via a system bus 230, and handles the execution of programs stored in a storage unit 228 and loaded into RAM 227. The RAM 227 is a typical type of volatile storage device which can be directly accessed by the CPU 226, and is used as a work area or another temporary data storage area for the CPU 226. The storage unit 228 functions as a temporary storage area and work memory when the inspection device is operating. A PDL analysis unit 229 executes processing for reading and analyzing PDL data, such as PDF, PostScript, or PCL, for example, received from the client computer 110 or the information processing device 109. A display unit 245 is, for example, a liquid crystal display connected to the inspection device, and accepts user inputs made to the inspection device, displays the state of the inspection device, and the like.

In the information processing device 109, a CPU 234 controls and performs calculations for each unit within the information processing device 109 via a system bus 239, and handles the execution of programs stored in a storage unit 236 and loaded into RAM 235. The RAM 235 is a typical type of volatile storage device which can be directly accessed by the CPU 234, and is used as a work area or another temporary data storage area for the CPU 234. The storage unit 236 functions as a temporary storage area and work memory when the information processing device is operating. A network interface ("NW I/F" hereinafter) 237 is connected to a NW I/F 240 over a network. The information processing device 109 communicates with the inspection device 108 via the NW I/F 237 and a NW I/F 232. Additionally, the information processing device 109 is connected to the client computer 110 via the NW I/F 237 and the NW I/F 240.

In the client computer 110, a CPU 243 controls and performs calculations for each unit within the client computer 110 via a system bus 246, and handles the execution of programs stored in a storage unit 244 and loaded into RAM 242. The RAM 242 is a typical type of volatile storage device which can be directly accessed by the CPU 243, and is used as a work area or another temporary data storage area for the CPU 243. The storage unit 244 functions as a temporary storage area and work memory when the client computer is operating.

Internal Configuration of Printing System

Figure 3:
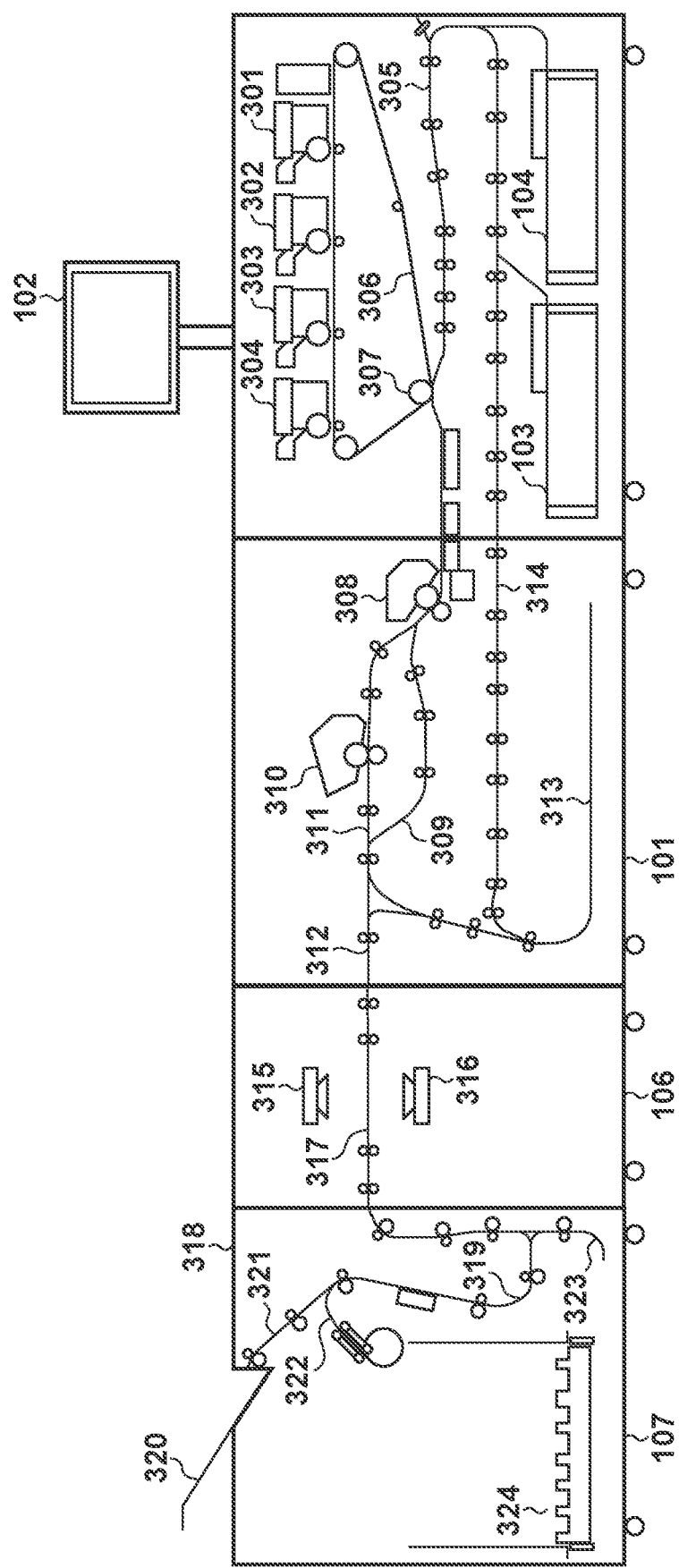
FIG. 3 is a diagram illustrating the internal configuration of the information processing device, an inspection unit, the printing device, and a large-capacity stacker according to embodiments.

FIG. 3 is a diagram illustrating the internal configurations of the printing device 101, the inspection unit 106, and the large-capacity stacker 107. The printing device 101 accepts user inputs through the UI panel 102, displays printing and device statuses, and the like. Various types of paper can be held in the paper feed decks 103 and 104. In each paper feed deck, it is possible to separate only the uppermost sheet of the held paper and transport that sheet to a paper transport path 305.

Developing stations 301 to 304 form toner images using Y, M, C, and K color toners, respectively, in order to form a color image. The toner images formed here undergo a primary transfer to an intermediate transfer belt 306. The intermediate transfer belt 306 rotates in what is the clockwise direction in FIG. 3, and the toner image is transferred to the paper transported from the paper transport path 305 at a secondary transfer position indicated by 307. A fixing unit 308 includes a pressure roller and a heating roller, and fixes the toner image onto the paper by melting and compressing the toner as the paper passes between the rollers.

The paper which has exited the fixing unit 308 is transported to 312 through a paper transport path 309. If, due to the type of the paper, further melting and pressure are needed for the fixing, the paper that has traversed the fixing unit 308 is transported to a second fixing unit 310 using the above paper transport path; and after additional melting and pressure have been applied, the paper is transported to 312 through a paper transport path 311. If the image formation mode is double-sided, the paper is transported to a paper inversion path 313, and after being inverted in the paper inversion path 313, the paper is transported to a double-sided transport path 314, where image transfer of the second side is performed at the secondary transfer position 307.

CISs 315 and 316 are disposed opposite each other within the inspection unit 106. The CIS 315 is a sensor for reading a top surface of the paper, and the CIS 316 is a sensor for reading a bottom surface of the paper. The inspection unit 106 uses the CISs 315 and 316 to scan the paper at the timing at which the paper transported in a paper transport path 317 reaches a predetermined position. The scanned image is sent to the inspection device 108 via the inspection device I/F 215 and the inspection unit I/F 231. The CPU 226 of the inspection device 108 determines whether or not there is a defect in the received image, and notifies the inspection unit 106 of the determination result via the inspection unit I/F 231 and the inspection device I/F 215 again. The CPU 216 notifies the large-capacity stacker 107 of the received determination result via the accessory I/Fs 214 and 220. The inspection device 108 holds a reference image corresponding to a sheet, and inspects the print quality by comparing the image captured by the inspection unit 106 with the reference image. At this time, for example, when a single document is printed in units of copies, the content printed on each sheet is different in each copy. Accordingly, the inspection device 108 changes the reference image as the printing progresses. If the job is one in which the printing progresses in page order (sheet order), the corresponding reference image is switched as well.

The large-capacity stacker 107 is capable of holding a large volume of paper. The large-capacity stacker 107 includes a main tray 324 serving as a tray in which the paper is stacked. The paper which has passed through the inspection unit 106 enters the large-capacity stacker 107 via a paper transport path 319. The paper is stacked in the main tray 324 from the paper transport path 319 via a sheet transport path 322. The large-capacity stacker 107 further includes a top tray 320 serving as a discharge tray. The CPU 221 controls the paper transport path to discharge paper in which a defect has been detected by the inspection device 108 to the top tray 320. When being output to the top tray 320, the paper is transported to the top tray 320 from the paper transport path 319 through a paper transport path 321. An inverting unit 323 for inverting sheets is used when loading paper onto the main tray 324. To ensure that the orientation of incoming paper is the same as the orientation of the paper when the paper is loaded, the paper is inverted once by the inverting unit 323 when the paper is loaded into the main tray 324. When transporting the paper to the top tray 320, the sheet is discharged as-is, i.e., without being flipped, during loading, and thus the inverting operation is not performed by the inverting unit 323.

Processing by Inspection Device

Figure 4:
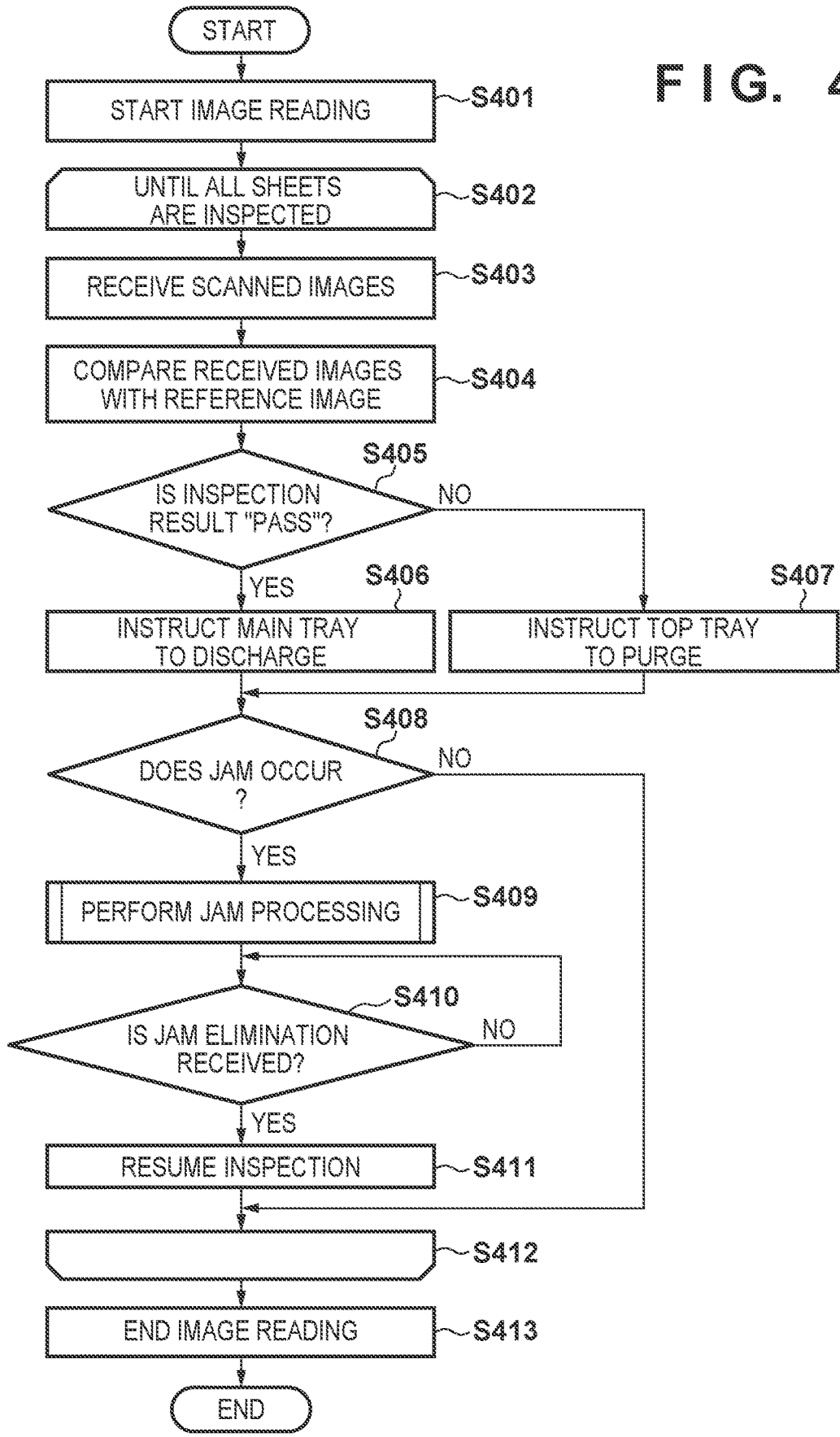
FIG. 4 is a flowchart illustrating basic operations of the inspection device according to embodiments.

FIG. 4 is a flowchart illustrating basic operations performed by the inspection device 108 during inspection.

In step S401, the CPU 226 accepts an image reading start instruction from the user through the display unit 245. The sequence then moves to step S402, where if there is a sheet to be inspected, the sequence moves to step S403. Step S402 indicates that the steps from S402 to S412 are repeated, as well as the conditions for the repetition. In step S402, the condition is that there are uninspected sheets to be inspected.

In step S403, the inspection unit I/F 231 receives the images scanned by the CIS 315 and the CIS 316 from the inspection device I/F 215. Then, in step S404, the CPU 226 compares the reference image stored in the RAM 227 with the scanned images to be inspected, received in step S403. It is assumed that this reference image is sent from the inspection device I/F 215 to the inspection unit I/F 231 by scanning the paper printed by the printing device 101 using the CISs 315 and 316, and stored in RAM 227, in advance before the start of this flow. In this comparison operation, first, image positions of the reference image and the scanned image to be inspected are aligned using characteristic points of the images as reference points for alignment. Next, in the scanned image to be inspected, the four corners of the paper and the reference points for alignment of the scanned image are analyzed, and it is detected whether there is any misalignment of the image with respect to the paper. Next, density values of the reference image and the scanned image to be inspected are compared on a pixel-by-pixel basis. If, as a result of the foregoing processing, no defect is detected, the inspection result is "pass".

Next, in step S405, if the inspection result is "pass", the sequence moves to step S406, where the inspection unit I/F 231 instructs the inspection device I/F 215 that the inspection result is "pass", i.e., that the sheet is to be discharged to the main tray 324 of the large-capacity stacker 107. The sequence then moves to steps S408 to S412, and the processing of steps S402 to S412 is repeated until the inspection is complete for all the sheets. Once the inspection is complete for all the sheets, the sequence moves to step S413, where the CPU 226 accepts an instruction from the user to end the reading of images through the display unit 245.

If the inspection result is "fail" in step S405, the sequence moves to step S407. In step S407, the inspection unit I/F 231 notifies the inspection device I/F 215 that the inspection result is "fail", i.e., instructs that the sheet is to be discharged to the top tray 320 of the large-capacity stacker 107. The sequence then moves to steps S408 to S412, and the processing can then be completed in the same manner as when the inspection result is "pass", described above. Note that the selection of the discharge tray of the large-capacity stacker 107 is made by selecting either the paper transport path 321 or the sheet transport path 322 as the transport path. The instruction for selecting the transport path may be made, for example, from the accessory I/F 214 of the inspection unit 106 to the large-capacity stacker 107 via the cable 225 and the accessory I/F 220 of the large-capacity stacker 107.

Steps S408 to S411 are processing performed when a jam occurs in the printing device 101. In step S408, the inspection unit I/F 231 determines whether a jam has occurred. Specifically, a jam may be determined to have occurred if the inspection unit I/F 231 receives jam occurrence information of a print processing device from the inspection device I/F 215. If it is determined that a jam has occurred, the jam processing described in the embodiment is then performed in step S409. As an overview, the jam processing includes inspection suspension processing, waiting for the completion of the transport of paper remaining in the device, and the calculation of an inspection recovery starting page.

In step S410, the inspection unit I/F 231 stands by to receive a jam elimination notification for the print processing device from the inspection device I/F 215. When, in step S410, the inspection unit I/F 231 receives the jam elimination notification for the print processing device from the inspection device I/F 215, the sequence moves to step S411.

In step S411, the CPU 226 resumes the inspection from a recovery starting page calculated in step S409. In step S412, the inspection processing is repeated until the inspection is complete for all the sheets.

The inspection is resumed in synchronization with the resuming of the printing. In other words, when printing is suspended due to a jam, the printing resumes from the next page after the last page that was discharged correctly. In the present embodiment, the inspection after printing is resumed is also synchronized with the printing, and resumes from the inspection of the page at which printing was resumed.

Note that the example described here is merely one example, and for example, the image reading start instruction from the user made through the display unit 245 may instead be made automatically in conjunction with an instruction to start printing made in the printing device 101, the information processing device 109, the client computer 110, or the like, and the format thereof is not limited. Additionally, an image reading end instruction made by the user through the display unit 245 may be made automatically in conjunction with the end of printing in the printing device 101, and the format thereof is not limited.

Processing by Inspection Unit

Figure 5:
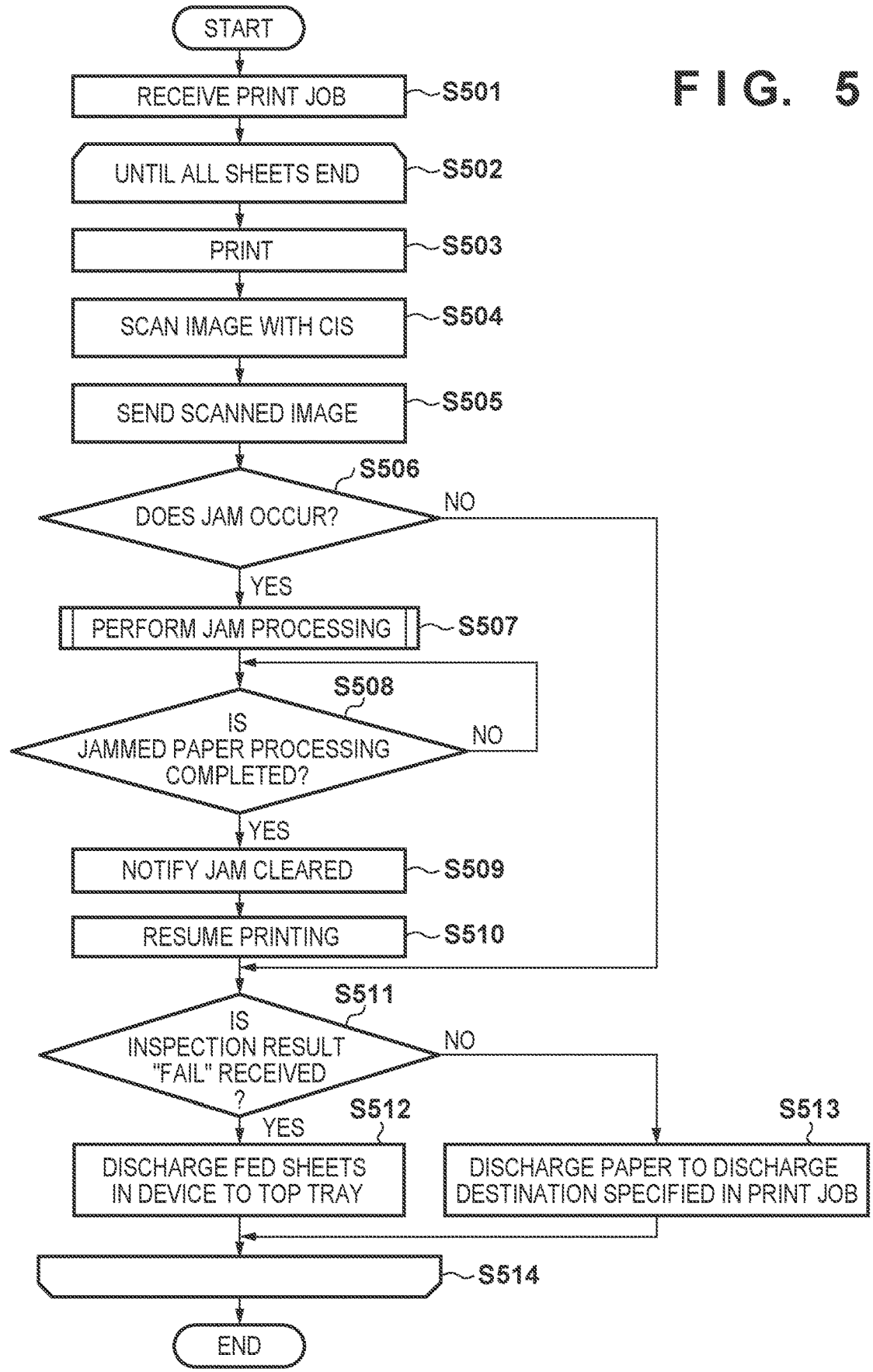
FIG. 5 is a flowchart illustrating basic operations of the printing device and the inspection unit during inspection, according to embodiments.

FIG. 5 is a flowchart illustrating operations performed by the inspection unit 106 during inspection. Note that because the inspection is performed in synchronization with the printing, some operations performed by the printing device 101 will be described as well.

In step S501, the CPU 201 of the printing device 101 receives a print job and starts printing. The sequence then moves to step S502, and if there is paper to be inspected, the sequence moves to step S503. Step S502 indicates that the steps from S502 to S514 are repeated, as well as the conditions for the repetition. In step S502, the condition is that there are uninspected sheets to be inspected.

In step S503, the printing device 101 prints an image onto the paper. Next, in step S504, the image capturing unit 218 of the inspection unit 106 uses the CIS 315 and the CIS 316 to scan the image printed onto the paper which is transported. The sequence then moves to step S505, where the inspection device OF 215 of the inspection unit 106 sends the image scanned in step S504 to the inspection unit OF 231 of the inspection device 108.

The sequence then moves to step S506. In step S506, if the CPU 201 of the printing device 101 has detected a jam, the sequence moves to step S507. At this time, the jam may occur anywhere in the printing device 101, the inspection unit 106, and the large-capacity stacker 107, and the location of the jam is not limited. If the jam has occurred in the inspection unit 106, the large-capacity stacker 107, or the like, the CPU 201 obtains corresponding jam information, the location of the jam, and the like via the accessory I/Fs 214, 220, and 208. On the other hand, if no jam has occurred in step S506, the sequence moves to step S511.

Once the sequence moves to step S507, the CPU 201 of the printing device 101 performs the jam processing described in the embodiment. As an overview, the jam processing includes a notification of the jam occurrence information, and standing by until all of the jammed paper in the device has been processed. Once all of the jammed paper in the device has been processed, a jam processing screen is displayed. Note that the present embodiment assumes that, for example, the transport of sheets upstream from the jammed paper is stopped, and those sheets remain in the device.

In step S508, the CPU 201 stands by until the jammed paper is removed and the jam state is cleared. The sequence moves to step S509 once the jam state is cleared.

In step S509, the CPU 201 of the printing device 101 notifies the CPU 216 of the inspection unit 106 and the CPU 221 of the large-capacity stacker 107 that the jam has been cleared, via the accessory I/Fs 208, 214, and 220. Additionally, the CPU 201 notifies the CPU 234 of the information processing device 109 that the jam has been cleared, via the NW I/Fs 207 and 238.

Next, in step S510, the CPU 201 outputs a printing resume instruction. The destinations of the instruction are the printing device 101, as well as the inspection unit 106 and the large-capacity stacker 107 downstream from the printing device 101. Additionally, the inspection device I/F 215 of the inspection unit 106 outputs an inspection resume instruction to the inspection unit I/F 231 of the inspection device 108. In response to this instruction, reprinting of the print job following the jammed paper is started, and the sequence moves to step S511.

In step S511, if the inspection device I/F 215 of the inspection unit 106 has received an inspection result "fail" from the inspection unit I/F 231 of the inspection device 108, the sequence moves to step S512. In step S512, the CPU 216 of the inspection unit 106 instructs the accessory I/Fs 208, 214, and 220 to discharge all the paper, after the paper for which the inspection result is "fail", which has already been fed from the paper feed decks 103 and 104 and is present in the paper transport path, to the top tray 320.

If the inspection device I/F 215 has not received an inspection result of "fail" in step S511, the sequence moves to step S513, where the CPU 216 instructs the accessory I/Fs 214 and 220 to discharge that paper to the discharge destination specified in the print job. The sequence then moves to step S514, and the processing of steps S502 to S514 is repeated until the inspection is complete for all the sheets. Once the inspection is complete for all the sheets, the printing also ends, and thus this flow ends as well. Note that the top tray 320 is a tray for discharging a printed sheet for which the inspection result is determined to be unfavorable, as well as the sheets following thereafter, and therefore cannot be specified as a discharge destination, or is preferably not specified as a discharge destination.

Specific embodiments for automatically calculating the inspection recovery starting page and resuming the inspection when a jam occurs will be described next.

First Embodiment

Figure 8:
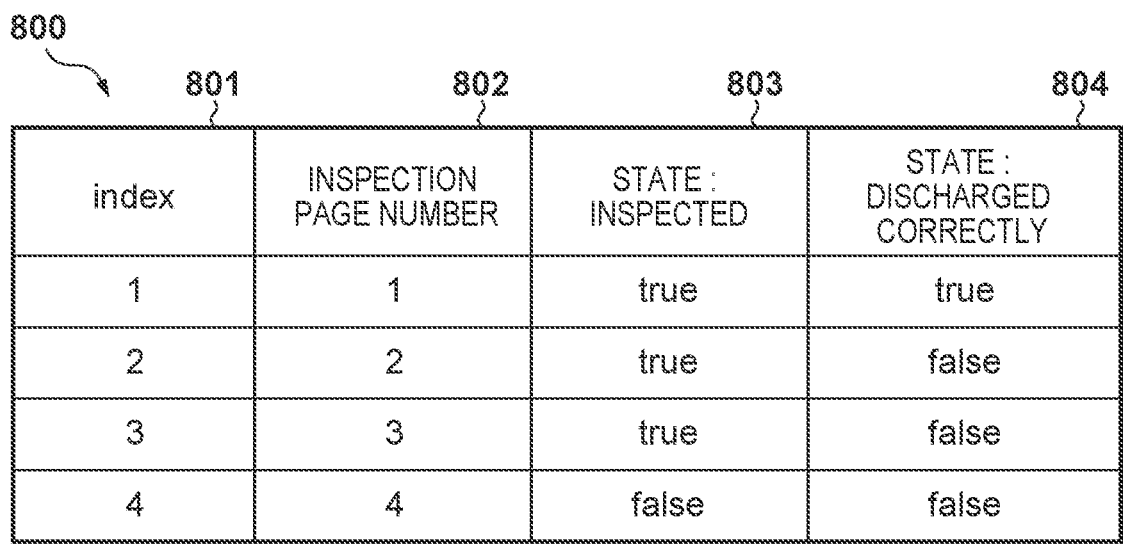
FIG. 8 is a diagram illustrating an example of an inspection resuming page management table according to the first embodiment.

The present embodiment will describe the inspection device 108 using an inspection status management table 800, illustrated in FIG. 8, to automatically calculate the inspection recovery starting page when a jam has occurred.

Jam Processing by Inspection Device

Figure 6:
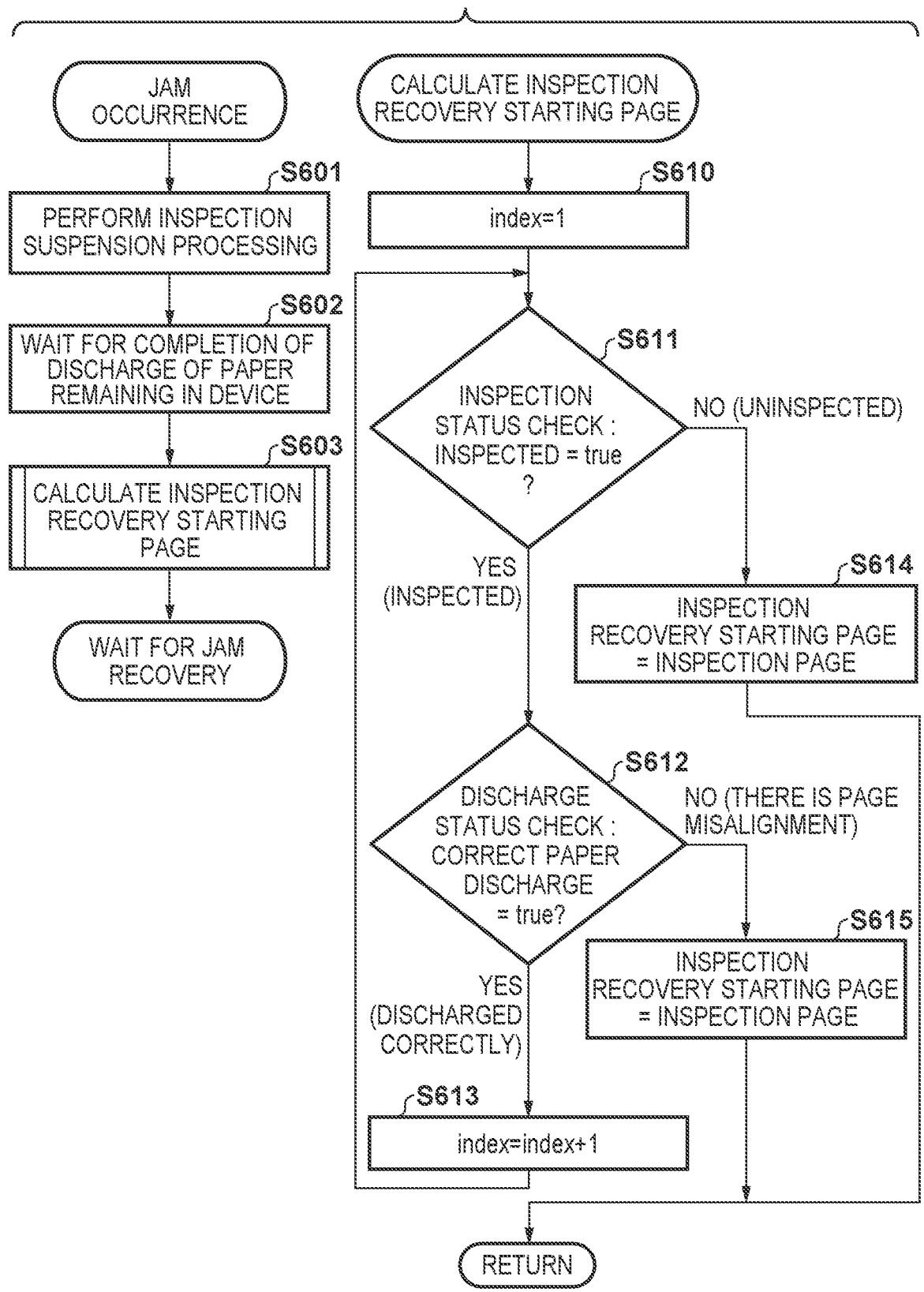
FIG. 6 is a flowchart illustrating basic operations of the inspection device according to a first embodiment.

FIG. 6 is a flowchart illustrating operations performed by the inspection device 108 when a jam occurs. Specifically, the details of the operations performed in step S409 of the flowchart in FIG. 4 are illustrated.

In step S601, the CPU 226 of the inspection device 108 issues an inspection suspension instruction to the inspection device I/F 215 via the inspection unit I/F 231, and controls the inspection unit 106 and the inspection device 108 to stop inspection.

Next, in step S602, the CPU 226 waits until all the jammed sheets in the printing device 101 have been processed (e.g., removed) and the paper that remains in the device is discharged to the exterior of the device. The sequence moves to step S603 when all the jammed sheets in the device have been processed.

In step S603, the CPU 226 of the inspection device 108 executes steps S610 to S615 to calculate the inspection recovery starting page. The inspection status management table 800, which is referred to when executing steps S610 to S615, will be described here with reference to FIG. 8.

Inspection Status Management Table

FIG. 8 illustrates the inspection status management table 800 that is referenced in order to calculate the inspection recovery starting page. The inspection status management table 800 is constituted by a management table index 801, an inspection page number 802, an inspection status 803, and a correct paper discharge status 804. The management table index 801 is an index used when referring to an inspection table. The inspection page number 802 is a page number that identifies an inspection page. Here, as an example, the number is a unique number assigned sequentially from when the inspection starts. The inspection status 803 indicates whether or not an inspection has been performed for the inspection page number. Here, "true" indicates that the inspection has taken place, and "false" indicates that the inspection has not taken place. The correct paper discharge status 804 indicates whether the inspection page has been discharged correctly. Here, "true" indicates that the page has been discharged to the specified discharge destination correctly, and "false" indicates that the page has not been discharged. Note that the "page number" mentioned here is unrelated to the pages of the original document, and may be regarded as a value indicating the order of the sheets, i.e., order information. For example, even with double-sided printing in which multiple pages of the original document are laid out on one side, the inspection page number in FIG. 8 can be regarded as order information indicating the printing order for each sheet where multiple document pages are formed on both sides.

The timing for updating the information in the inspection status management table 800 will be described next with reference to the timing charts in FIGS. 9A and 9B.

Updating Inspection Status Management Table

FIGS. 9A and 9B illustrate the flow of processing for updating the information in the inspection status management table 800 on the basis of a case in which a jam has occurred on the third page of paper, but the paper up to the second page has been discharged to the exterior of the device correctly. FIGS. 9A and 9B are a single continuous chart which has been split between two drawings, and will therefore be treated as a single drawing in the following descriptions.

In step S901, the inspection unit 106 transfers a scanned image of a scanned detection target (a first page) to the inspection device 108 (step S505 in FIG. 5). The inspection device 108 compares the received scanned image with the reference image and determines the inspection result. Specifically, the inspection device 108 receives the scanned image in step S403 of FIG. 4, compares the received image with the reference image in step S404, and determines the inspection result. Misalignment from a reference position (described earlier), color shift, or the like is the subject of this determination.

In step S902, the inspection device 108 notifies the inspection unit 106 of the inspection result for the first page. Assume here that the inspection result for the first page is "pass". At this timing, the inspection device 108 executes steps S406 and S407 in accordance with the inspection result.

In step S903, in the inspection status management table 800, the inspection device 108 writes "true" into the inspection status 803 corresponding to the inspection page number 802.

In step S904, the printing device 101 discharges the inspected first page of paper to the exterior of the device correctly, and notifies the inspection unit 106 of discharge information indicating that the first page of paper has been discharged.

In step S905, the inspection unit 106 notifies the inspection device 108 of the received discharge information.

In step S906, in the inspection status management table 800, the inspection device 108 writes "true" into the correct paper discharge status 804 corresponding to the inspection page number 802.

In steps S907 to S912, the inspection status 803 is written into the inspection status management table 800 for the second and third pages of paper, in the same manner as in steps S901 to S903. At the point in time of step S912, the inspection status 803 is "true" up to the third page.

In step S913, the printing device 101 detects a jam while the third page of paper is being transported, and notifies the inspection unit 106 of the location where the jam has occurred and that the jam has occurred on the third page.

Figure 7:
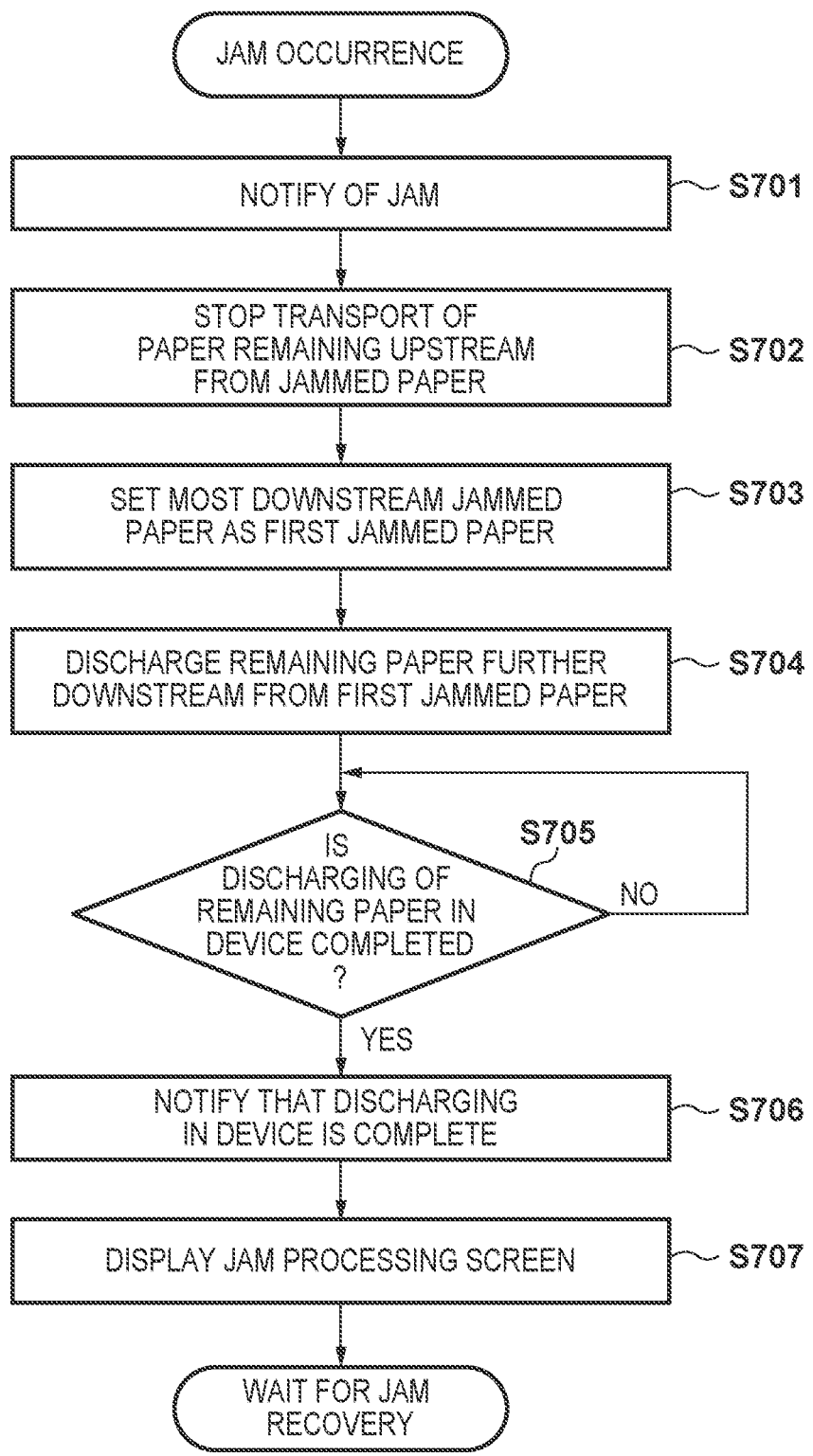
FIG. 7 is a flowchart illustrating basic operations of the printing device and the inspection unit during inspection, according to first and second embodiments.

In step S914, the inspection unit 106 executes steps S506 and S507 of FIG. 5, and notifies the inspection device 108 of the received jam information (step S701 of FIG. 7).

In step S915, the inspection device 108 executes steps S408 and S409 of FIG. 4, and suspends the inspection processing (step S601 of FIG. 6).

In steps S916 to S918, the inspected second page of paper is discharged correctly to the outside of the device, and in the inspection status management table 800, "true" is written into the correct paper discharge status 804 corresponding to the inspection page number 802, in the same manner as in steps S904 to S906. At the point in time of step S918, the correct paper discharge status 804 is "true" up to the second page.

In step S919, when the paper which remained within the device has finished being discharged, the printing device 101 notifies the inspection unit 106 that the transport in the device is complete.

In step S920, the inspection unit 106 notifies the inspection device 108 of the received notification that the transport in the device is complete (step S706 in FIG. 7).

In step S921, the inspection device 108 obtains the information in the inspection status management table 800, and then, in step S922, calculates the inspection recovery page (steps S610 to S615). The information obtained in step S921 is the information indicated in the inspection status management table 800 in FIG. 8. The foregoing has described the flow of processing for updating the information in the inspection status management table 800. Through the foregoing, the inspection device 108 can record the completion of inspections and discharges in units of pages described with reference to FIG. 8. A page from which to resume the inspection can also be found on the basis thereof. The inspection status management table 800 may be created, for example, on a job-by-job basis. For example, when one print job is completed, the table may be deleted, and the creation of a new table can be started when a new print job is started. In this case, the index 801 and the inspection page number 802 match, and thus only one thereof need be recorded.

Determination of Inspection Recovery Page by Inspection Device

Next, returning to FIG. 6, an example of the processing for calculating the inspection recovery page will be described with reference to the flowchart and the inspection status management table 800 illustrated in FIG. 8.

In step S610, the CPU 226 initializes, to 1, the index for referencing the information in the inspection status management table 800.

In step S611, the CPU 226 refers to the inspection status 803 for the index 801 of 1 in the inspection status management table 800. If the referenced inspection status 803 indicates "inspected" ("true"), the sequence moves to step S612. If the referenced inspection status 803 indicates "uninspected" ("false"), the sequence moves to step S614. Here, when the index 801 in the inspection status management table 800 is 1, the inspection status 803 is "inspected" ("true"), and thus the sequence moves to step S612.

In step S612, the CPU 226 refers to the correct paper discharge status 804 for the index 801 of 1 in the inspection status management table 800. If the referenced correct paper discharge status 804 indicates "discharged correctly" ("true"), the sequence moves to step S613. If the referenced correct paper discharge status 804 indicates "not yet discharged" ("false"), the sequence moves to step S615. Here, when the index 801 in the inspection status management table 800 is 1, the correct paper discharge status 804 is "discharged" ("true"), and thus the sequence moves to step S613.

In step S613, the CPU 226 increments, by 1, the index for referencing the information in the inspection status management table 800, after which the sequence moves to step S611. Here, the index is set to 2. Thereafter, steps S611 to S613 are repeated for "inspected" and "discharged correctly". In the example illustrated in FIG. 8, steps S611 to S613 are repeated until the index reaches 3.

In step S611, the CPU 226 refers to the inspection status 803 for the index 801 of a value of 3 in the inspection status management table 800. Because the referenced inspection status 803 is "inspected" ("true"), the sequence moves to step S612.

In step S612, the CPU 226 refers to the correct paper discharge status 804 for the index 801 of 1 in the inspection status management table 800. The referenced correct paper discharge status 804 indicates "not yet discharged" ("false"), and thus the sequence moves to step S615.

In step S615, the CPU 226 sets the inspection page number 802, for the index 801 of 3 in the inspection status management table 800, to the inspection recovery starting page. In other words, in step S615, the sheet number of the sheet that has been inspected and has not been discharged correctly is set to the first sheet number (page number) for the resumed inspection, i.e., the inspection recovery starting page. Here, 3 is set to the inspection recovery starting page, for example. This indicates that the processing will resume with the inspection of the third page.

Note that step S614 is a process performed when a jam occurs upstream from the inspection unit 106. For example, when a jam occurs upstream from the inspection unit 106, it is possible that the paper downstream from the page where the jam occurred has already been inspected and discharged correctly. In this case, the inspection recovery starting page is calculated in step S614 by setting the uninspected inspection page as the inspection recovery starting page.

As described thus far, in the present embodiment, a series of sheets printed in one print job, up to the last sheet that has been inspected and discharged correctly, are treated as having already been printed, for example. The inspection recovery starting page is then determined so that the inspection is resumed from the immediately-following uninspected page or page that has not been discharged correctly. In other words, the inspection recovery starting page is determined so that the inspection is resumed from the first uninspected page, or page that has not been discharged correctly, indicated in the inspection status management table 800. Operations performed on the inspection unit 106 side will be described next.

Jam Processing by Inspection Unit

FIG. 7 is a flowchart illustrating operations performed by the printing device 101 and the inspection unit 106 when a jam occurs. Specifically, the details of the operations performed in step S507 of the flowchart in FIG. 5 are illustrated.

In step S701, the CPU 201 of the printing device 101 notifies the CPUs 216 and 221 of the inspection unit 106 and the large-capacity stacker 107, respectively, of the jam state, via the accessory I/Fs 208, 214, and 220. The CPU 216 also notifies the inspection unit I/F 231 of the inspection device 108 of the jam state through the inspection device I/F 215. The jam state includes jam location information that can be determined by sensors (not shown), provided inside the printing device 101, the inspection unit 106, and the large-capacity stacker 107, detecting paper. Additionally, because the CPU 201 can detect that the paper has been printed on and discharged to the exterior of the device, it is possible to detect which paper is jammed, and that paper information is also included in the jam state. Then, the CPU 201 notifies the CPU 234 of the information processing device 109 of the jam state, via the NW I/Fs 207 and 238. This makes it possible for the information processing device 109 to know what number sheet of the paper used in the print job has jammed.

In step S702, the CPU 201 stops the transport of the paper remaining upstream from the paper that caused the jam (called the "jammed paper"). By stopping new transport of the paper remaining upstream from the jammed paper, all the paper that has already started being transported upstream from the jam paper becomes jammed paper, e.g., paper for which it is necessary for the user to remove manually.

In step S703, the CPU 201 sets the jammed paper which is furthest downstream in the sheet transport path as the first jammed paper in internal parameters. The jammed paper which is furthest downstream then becomes the page from which printing is resumed in the jam recovery processing (described later). This makes it possible to perform recovery for the jammed paper.

In step S704, the CPU 201 discharges the remaining paper further downstream from the first jammed paper, after which the sequence moves to step S705.

In step S705, the CPU 201 stands by until the remaining paper has been completely discharged. Once the remaining paper has been completely discharged, the sequence moves to step S706. This is because in the calculation of the inspection recovery starting page described with reference to FIG. 6, it is necessary to update the inspection status management table 800 with the paper remaining within the device having been discharged.

In step S706, the CPU 201 notifies the CPU 216 of the inspection unit 106, via the accessory I/Fs 208 and 214, that the paper remaining within the device has been completely discharged. Additionally, the CPU 216 notifies the inspection unit OF 231 of the inspection device 108, through the inspection device OF 215, that the paper remaining within the device has been completely discharged.

In step S707, the CPU 201 displays the jam processing screen in the UI panel 203. The sequence then moves to step S508 of FIG. 5.

According to the present embodiment, through the sequences described above, the inspection unit 106 and the inspection device 108 can automatically resume inspection after jam processing has been performed. Accordingly, when a jam has occurred, the inspection can be resumed without burdening an operator with the inputting of a resume position.

To be more specific, when a jam occurs, the printing device 101 stops the transport of sheets upstream from the sheet that jammed, and discharges the sheets downstream therefrom. The inspection device 108 also records whether each sheet has been inspected and discharged. When resuming the printing, the printing device 101 resumes the printing from the first sheet where the jam occurred. The inspection unit 106 and the inspection device 108 also identify a sheet which has been inspected but has not been discharged correctly, or an uninspected sheet following a discharged sheet, and resume the inspection from the identified sheet. This makes it possible to avoid redundant inspections, as well as misalignment between the target sheet and the reference image, so that correct inspections can continue regardless of what location in the transport path the jam has occurred.

The present embodiment and the other embodiments described below are not limited to jams, and can also be applied to cases where after printing is suspended, printing is then resumed from a sheet that has already been printed and inspected.

Second Embodiment

The first embodiment described the inspection device 108 performing calculations using the inspection status management table 800. As another embodiment, it is conceivable for the inspection device 108 to automatically calculate the inspection recovery starting page when a jam has occurred, without using the inspection status management table 800 illustrated in FIG. 8. A specific embodiment will be described hereinafter. The processing on the inspection unit 106 side is the same as in FIG. 7, described in the first embodiment, and will therefore not be described here.

Figure 10:
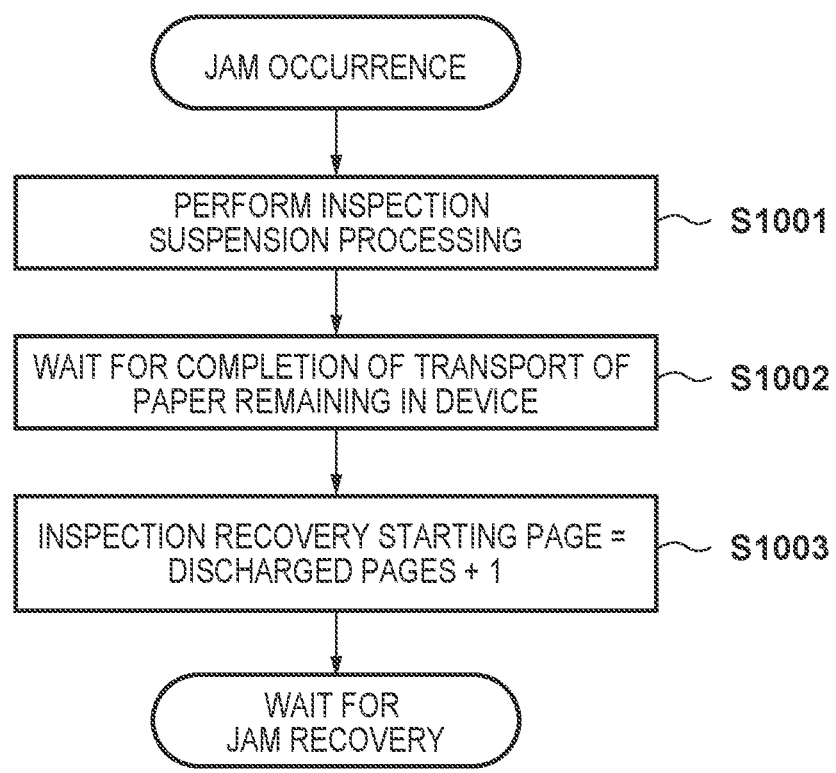
FIG. 10 is a flowchart illustrating basic operations of the inspection device according to the second embodiment.

FIG. 10 is a flowchart illustrating operations performed by the inspection device 108 when a jam occurs. Specifically, the details of the operations performed in step S409 of the flowchart in FIG. 4 are illustrated.

Steps S1001 and S1002 are the same as steps S601 and S602, and will therefore not be described here.

In step S1003, the CPU 226 calculates the inspection recovery starting page in accordance with inspected pages and discharged pages in the internal parameters.

Here, the flow of processing for calculating the inspection recovery starting page from a number of inspected pages and a number of discharged pages in the internal parameters, without using the inspection status management table 800, will be described with reference to the timing chart in FIG. 11.

Figure 11:
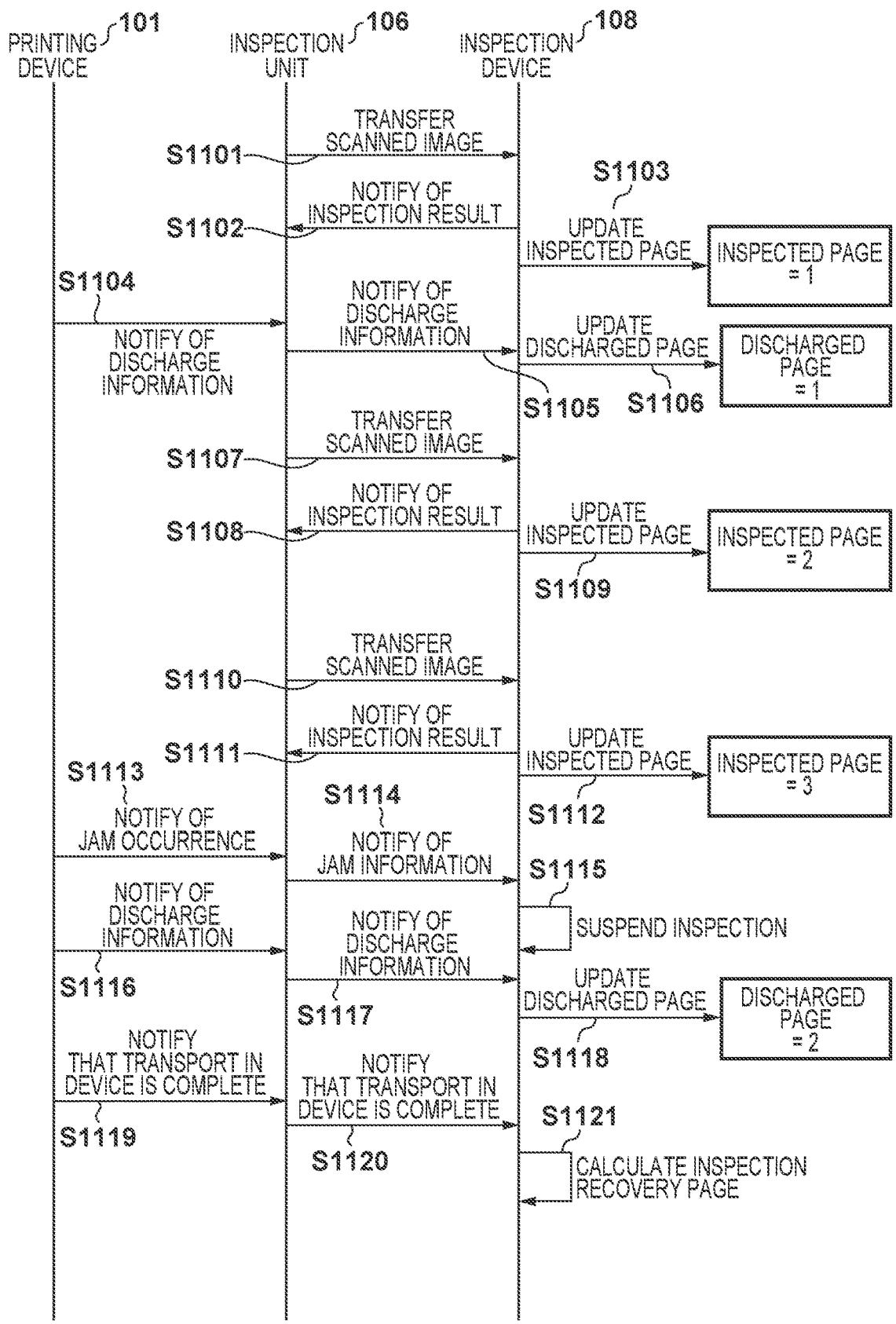
FIG. 11 is a timing chart for the inspection device and the inspection unit according to the second embodiment.

FIG. 11 illustrates the flow of processing for updating the information of the inspected pages and discharged pages in the internal parameters on the basis of a case in which a jam has occurred on the third page of paper, but the paper up to the second page has been discharged to the exterior of the device correctly.

In step S1101, the inspection unit 106 transfers a scanned image of a scanned detection target (a first page) to the inspection device 108 (step S505 in FIG. 5). The inspection device 108 compares the received scanned image with the reference image and determines the inspection result. Specifically, the inspection device 108 receives the scanned image in step S403 of FIG. 4, compares the received image with the reference image in step S404, and determines the inspection result.

In step S1102, the inspection device 108 notifies the inspection unit 106 of the inspection result for the first page. Assume here that the inspection result for the first page is "pass". At this timing, the inspection device 108 executes steps S406 and S407 in accordance with the inspection result.

In step S1103, the inspection device 108 writes the inspected page number for the inspected page in the internal parameters. "1" is written here.

In step S1104, the printing device 101 discharges the inspected first page of paper to the exterior of the device correctly, and notifies the inspection unit 106 of discharge information indicating that the first page of paper has been discharged.

In step S1105, the inspection unit 106 notifies the inspection device 108 of the received discharge information.

In step S1106, the inspection device 108 writes the discharged page number for the discharged page in the internal parameters. "1" is written here.

In steps S1107 to S1112, the inspected page number is written for the inspected page in the internal parameters, for the second and third pages of paper as well, in the same manner as in steps S1101 to S1103. At the point in time of step S1112, the inspected page in the internal parameters is "3".

In step S1113, the printing device 101 detects a jam while the third page of paper is being transported, and notifies the inspection unit 106 of the location where the jam has occurred and that the jam has occurred on the third page.

In step S1114, the inspection unit 106 executes steps S506 and S507 of FIG. 5, and notifies the inspection device 108 of the received jam information (step S701 of FIG. 7).

In step S1115, the inspection device 108 executes steps S408 and S409 of FIG. 4, and suspends the inspection processing (step S1001 of FIG. 10).

In steps S1116 to S1118, the second page of inspected paper is discharged correctly to the exterior of the device, and the discharged page number is written for the discharged page in the internal parameters, in the same manner as in steps S1104 to S1106. It is assumed that at the point in time of step S1118, "2" is written.

In step S1119, when the paper which remained within the device has finished being discharged, the printing device 101 notifies the inspection unit 106 that the transport in the device is complete.

In step S1120, the inspection unit 106 notifies the inspection device 108 of the received notification that the transport in the device is complete (step S706 in FIG. 7).

In step S1121, the inspection device 108 obtains the discharged page in the internal parameters, and calculates the inspection recovery page. Because the next discharged page is the inspection recovery starting page, the discharged page in the internal parameters is incremented and set to the inspection recovery starting page. The sequence then moves to step S410 of FIG. 4.

Through the sequence described above, the inspection recovery starting page can be calculated without using the inspection status management table 800. Accordingly, when a jam has occurred, the inspection can be resumed without burdening an operator with the inputting of a resume position, in the same manner as in the first embodiment.

In the method for determining the inspection recovery starting page according to the present embodiment, the order information of the last inspected sheet, as well as the order information of the last sheet which was correctly discharged, is recorded. Thus because the inspection status management table 800 is not used, a smaller amount of memory space is required than in the first embodiment.

Third Embodiment

The first and second embodiments described the inspection device 108 as automatically calculating the inspection recovery starting page when a jam has occurred. As another embodiment, it is conceivable for the inspection unit 106 to automatically calculate the inspection recovery starting page when a jam has occurred.

The present embodiment will describe the inspection unit 106 using the inspection status management table 800, illustrated in FIG. 8, to automatically calculate the inspection recovery starting page when a jam has occurred. In the present embodiment, the inspection unit 106 calculates the inspection recovery starting page and notifies the inspection device 108 of the calculation result.

Jam Processing by Inspection Unit

FIG. 13 is a flowchart illustrating operations performed by the printing device 101 and the inspection unit 106 when a jam occurs. Specifically, the details of the operations performed in step S507 of the flowchart in FIG. 5 are illustrated.

Steps S1301 to S1306 are the same processing as steps S701 to S706, and will therefore not be described here.

In step S1307, the CPU 216 obtains the information in the inspection status management table 800, and calculates the inspection recovery page. The processing for this is the same as in steps S610 to S615 in FIG. 6 according to the first embodiment, and will therefore not be described here.

In step S1308, the CPU 216 notifies the inspection unit I/F 231 of the inspection recovery starting page through the inspection device I/F 215.

In step S1309, the CPU 201 displays the jam processing screen in the UI panel 203. The sequence then moves to step S508 of FIG. 5.

Figure 14A:
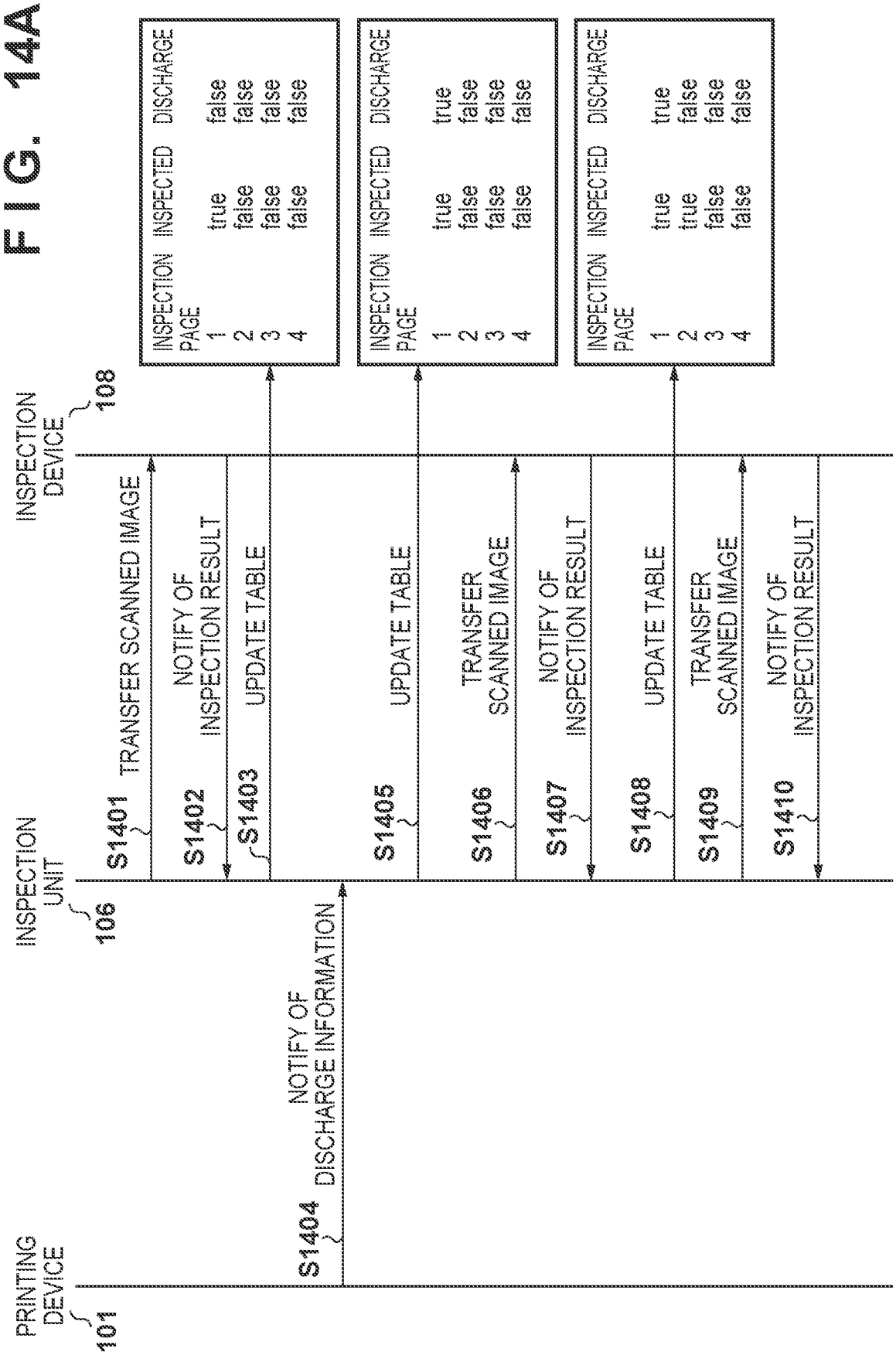
FIG. 14A is a timing chart for the inspection device and the inspection unit according to the third embodiment.
Figure 14B:
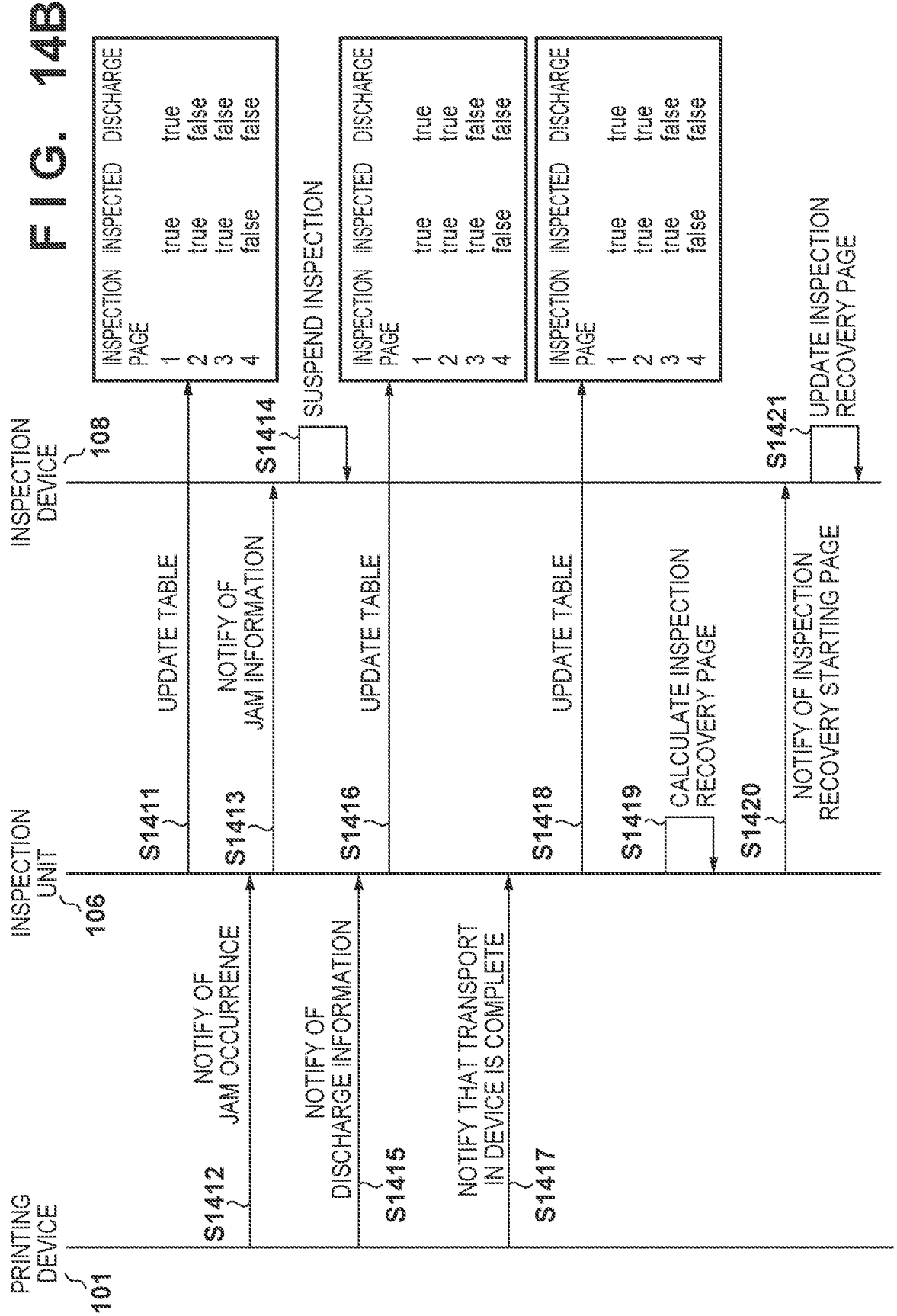
FIG. 14B is a timing chart for the inspection device and the inspection unit according to the third embodiment.

Update of Inspection Status Management Table and Calculation of Inspection Recovery Page The timing for updating the information in the inspection status management table 800 will be described next with reference to the timing charts in FIGS. 14A and 14B. FIGS. 14A and 14B are a single continuous chart which has been split between two drawings, and will therefore be treated as a single drawing in the following descriptions.

FIGS. 14A and 14B illustrate the flow of processing for updating the information in the inspection status management table 800 on the basis of a case in which a jam has occurred on the third page of paper, but the paper up to the second page has been discharged to the exterior of the device correctly.

In step S1401, the inspection unit 106 transfers a scanned image of a scanned detection target (a first page) to the inspection device 108 (step S505 in FIG. 5). The inspection device 108 compares the received scanned image with the reference image and determines the inspection result. Specifically, the inspection device 108 receives the scanned image in step S403 of FIG. 4, compares the received image with the reference image in step S404, and determines the inspection result.

In step S1402, the inspection device 108 notifies the inspection unit 106 of the inspection result for the first page. Assume here that the inspection result for the first page is "pass". At this timing, the inspection device 108 executes steps S406 and S407 in accordance with the inspection result.

In step S1403, in the inspection status management table 800, the inspection unit 106 writes "true" into the inspection status 803 corresponding to the inspection page number 802 upon receiving the inspection result.

In step S1404, the printing device 101 discharges the inspected first page of paper to the exterior of the device correctly, and notifies the inspection unit 106 of discharge information indicating that the first page of paper has been discharged.

In step S1405, in the inspection status management table 800, the inspection unit 106 writes "true" into the correct paper discharge status 804 corresponding to the inspection page number 802.

In steps S1406 to S1411, the inspection status 803 is written into the inspection status management table 800 for the second and third pages of paper, in the same manner as in steps S1401 to S1403. At the point in time of step S1411, the inspection status 803 is "true" up to the third page.

In step S1412, the printing device 101 detects a jam while the third page of paper is being transported, and notifies the inspection unit 106 of the location where the jam has occurred and that the jam has occurred on the third page.

In step S1413, the inspection unit 106 executes steps S506 and S507 of FIG. 5, and notifies the inspection device 108 of the received jam information (step S1301 of FIG. 13).

Figure 12:
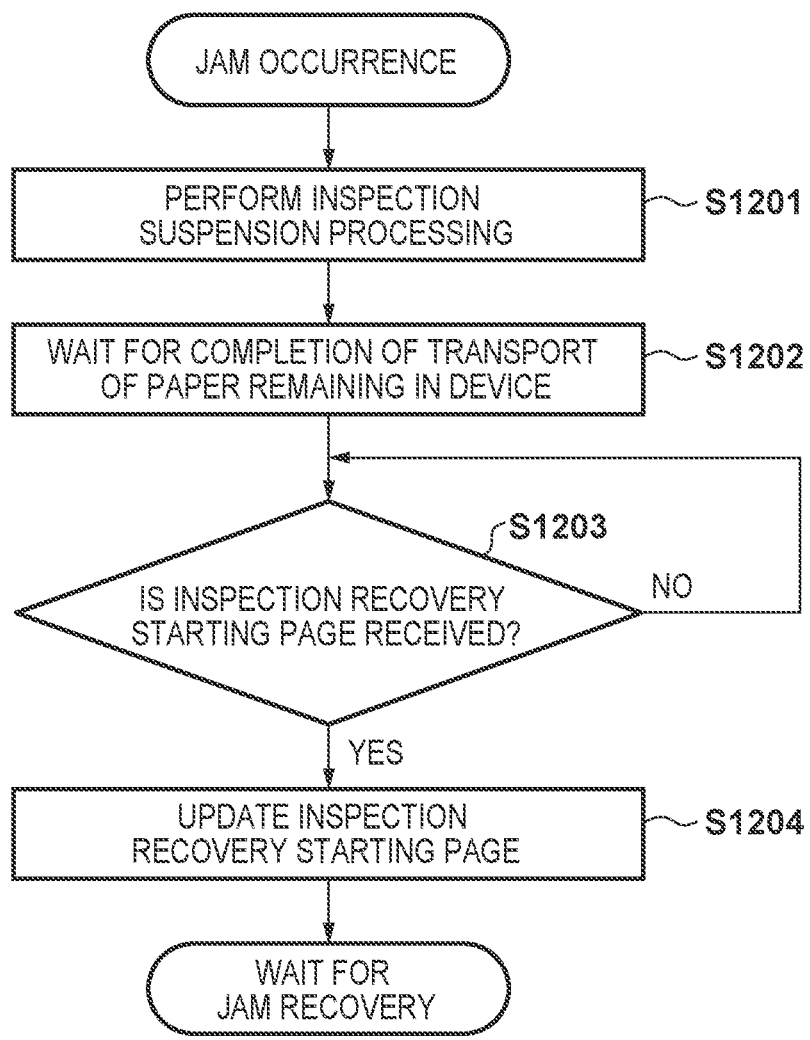
FIG. 12 is a flowchart illustrating basic operations of the inspection device according to third and fourth embodiments.

In step S1414, the inspection device 108 executes steps S408 and S409 of FIG. 4, and suspends the inspection processing (step S1201 of FIG. 12).

In steps S1415 to S1416, the inspected second page of paper is discharged correctly to the outside of the device, and in the inspection status management table 800, "true" is written into the correct paper discharge status 804 corresponding to the inspection page number 802, in the same manner as in steps S1404 to S1405. At the point in time of step S1416, the correct paper discharge status 804 is "true" up to the second page.

In step S1417, when the paper which remained within the device has finished being discharged, the printing device 101 notifies the inspection unit 106 that the transport in the device is complete.

In step S1418, the inspection unit 106 obtains the information in the inspection status management table 800, and then, in step S1419, calculates the inspection recovery page (steps S610 to S615). The information obtained in step S1418 is the information indicated in the inspection status management table 800 in FIG. 8. The foregoing has described the flow of processing for updating the information in the inspection status management table 800.

In step S1420, the inspection unit 106 notifies the inspection device 108 of the inspection recovery starting page calculated in step S1419 (step S1306 in FIG. 13).

In step S1421, upon receiving the inspection recovery starting page, the inspection device 108 sets the received inspection recovery starting page in the internal parameters.

Jam Processing by Inspection Device

FIG. 12 is a flowchart illustrating operations performed by the inspection device 108 when a jam occurs. Specifically, the details of the operations performed in step S409 of the flowchart in FIG. 4 are illustrated.

Steps S1201 and S1202 are the same as steps S601 and S602, and will therefore not be described here.

In step S1203, the CPU 226 stands by until the inspection recovery starting page is received from the inspection unit I/F 231. Once the inspection recovery starting page is received, the sequence moves to step S1204.

In step S1204, the CPU 226 stores the received inspection recovery starting page in the internal parameters, and moves the sequence to step S410 in FIG. 4.

Through the sequence described above, the inspection unit 106 can calculate the inspection recovery starting page using the inspection status management table 800. Accordingly, when a jam has occurred, the inspection can be resumed without burdening an operator with the inputting of a resume position, in the same manner as in the first and second embodiments.

Fourth Embodiment

The third embodiment described the inspection unit 106 performing calculations using the inspection status management table 800. As another embodiment, it is conceivable for the inspection unit 106 to automatically calculate the inspection recovery starting page when a jam has occurred, without using the inspection status management table 800 illustrated in FIG. 8. A specific embodiment will be described hereinafter. Because the flowchart illustrating operations performed by the inspection device 108 when a jam occurs in the present embodiment is the same as in FIG. 12 according to the third embodiment, descriptions thereof will not be given.

Figure 15:
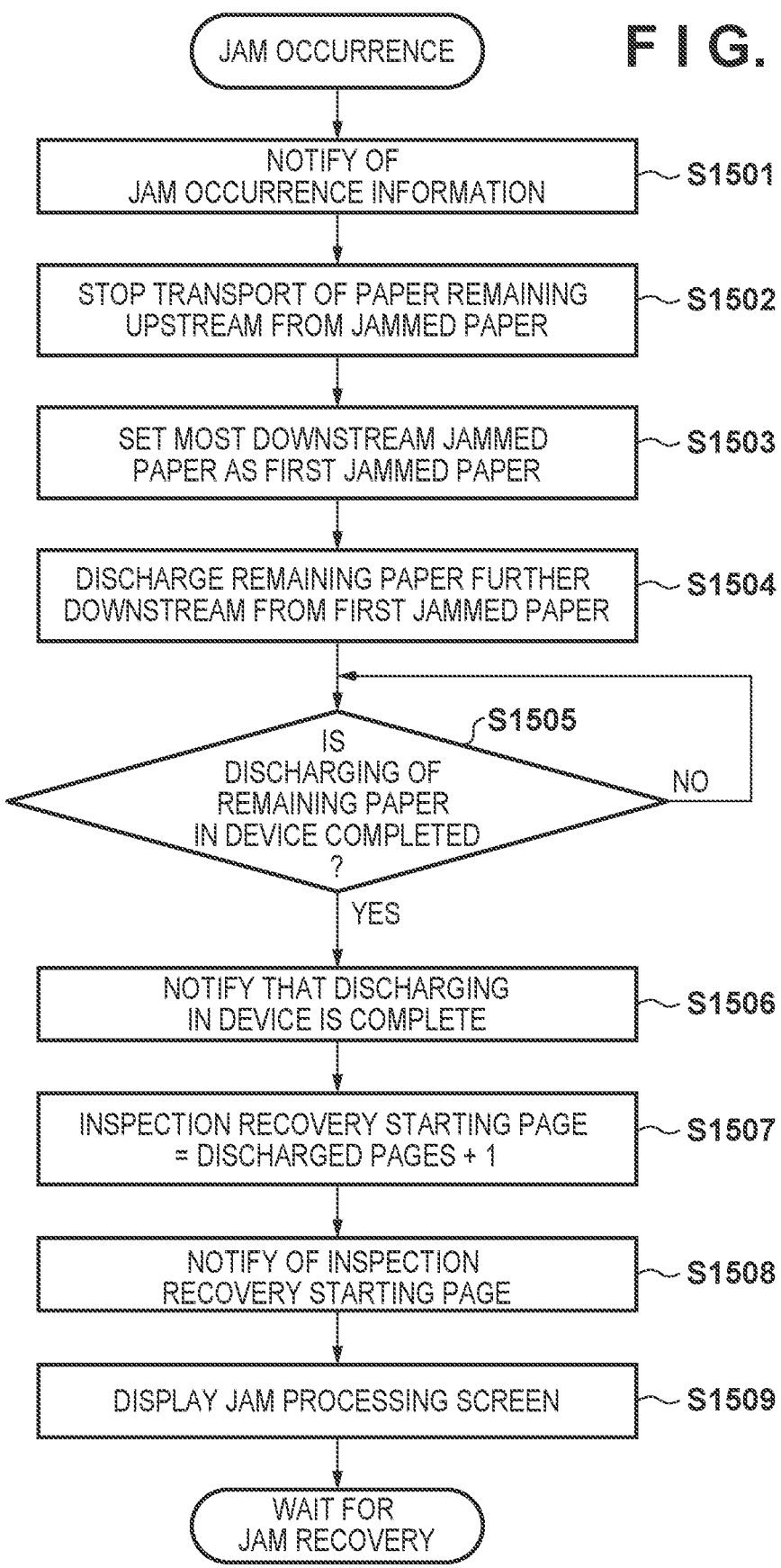
FIG. 15 is a flowchart illustrating basic operations of the printing device and the inspection unit during inspection, according to the fourth embodiment.

FIG. 15 is a flowchart illustrating operations performed by the printing device 101 and the inspection unit 106 when a jam occurs. Specifically, the details of the operations performed in step S507 of the flowchart in FIG. 5 are illustrated.

Steps S1501 to S1506 are the same processing as steps S1301 to S1306, and will therefore not be described here.

Figure 16A:
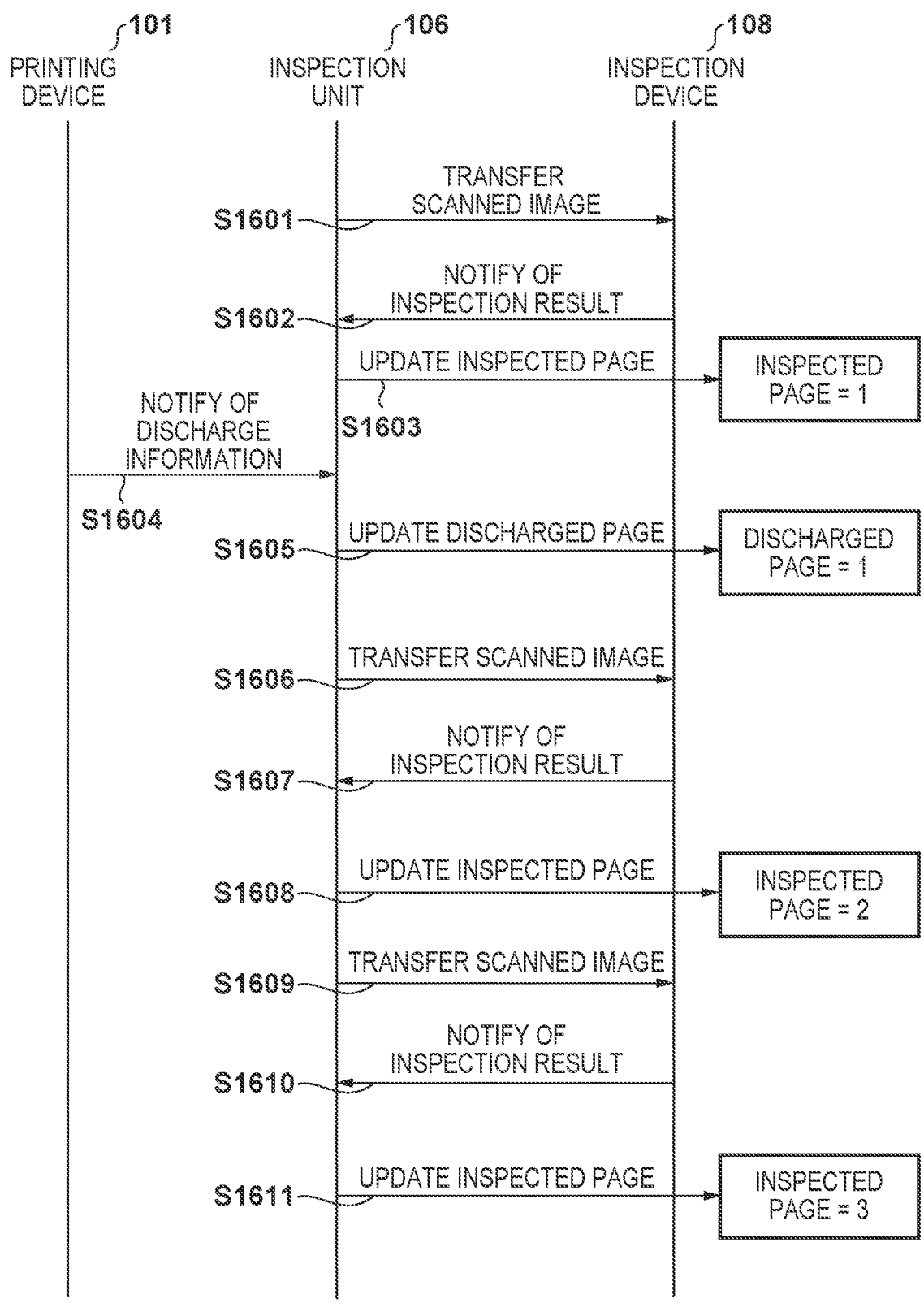
FIG. 16A is a timing chart for the inspection device and the inspection unit according to the fourth embodiment.
Figure 16B:
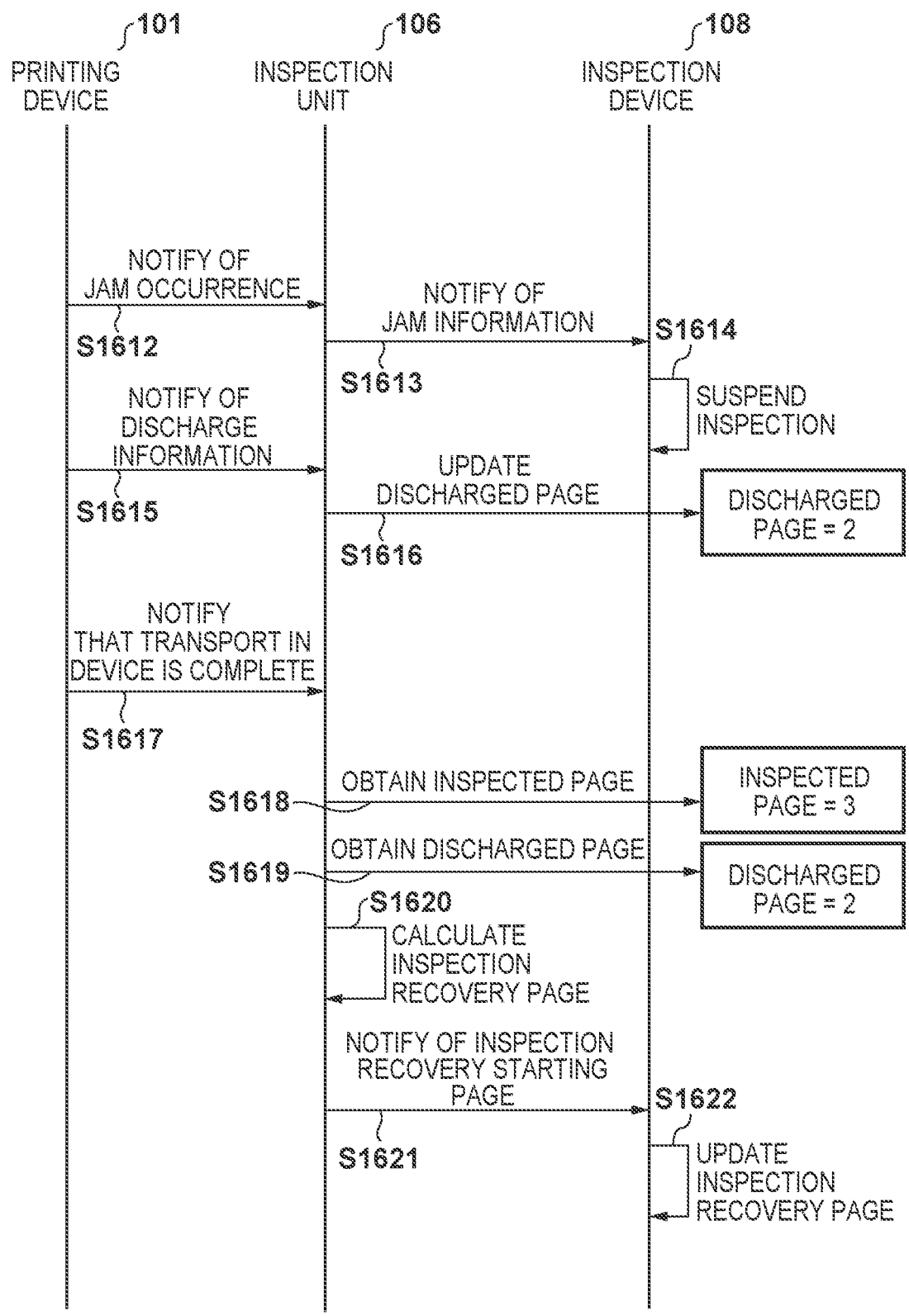
FIG. 16B is a timing chart for the inspection device and the inspection unit according to the fourth embodiment.

In step S1507, the CPU 216 of the inspection unit 106 calculates the inspection recovery starting page in accordance with inspected pages and discharged pages in the internal parameters. Here, the flow of processing for calculating the inspection recovery starting page from a number of inspected pages and a number of discharged pages in the internal parameters, without using the inspection status management table 800, will be described with reference to the timing chart in FIGS. 16A and 16B. FIGS. 16A and 16B are a single continuous chart which has been split between two drawings, and will therefore be treated as a single drawing in the following descriptions.

FIGS. 16A and 16B illustrate the flow of processing for updating the information of the inspected pages and discharged pages in the internal parameters on the basis of a case in which a jam has occurred on the third page of paper, but the paper up to the second page has been discharged to the exterior of the device correctly.

In step S1601, the inspection unit 106 transfers a scanned image of a scanned detection target (a first page) to the inspection device 108 (step S505 in FIG. 5). The inspection device 108 compares the received scanned image with the reference image and determines the inspection result. Specifically, the inspection device 108 receives the scanned image in step S403 of FIG. 4, compares the received image with the reference image in step S404, and determines the inspection result.

In step S1602, the inspection device 108 notifies the inspection unit 106 of the inspection result for the first page. Assume here that the inspection result for the first page is "pass". At this timing, the inspection device 108 executes steps S406 and S407 in accordance with the inspection result.

In step S1603, the inspection unit 106 writes the inspected page number for the inspected page in the internal parameters. "1" is written here.

In step S1604, the printing device 101 discharges the inspected first page of paper to the exterior of the device correctly, and notifies the inspection unit 106 of discharge information indicating that the first page of paper has been discharged.

In step S1605, the inspection unit 106 writes the discharged page number for the discharged page in the internal parameters. "1" is written here.

In steps S1606 to S1611, the inspected page number is written for the inspected page in the internal parameters, for the second and third pages of paper as well, in the same manner as in steps S1601 to S1603. At the point in time of step S1611, the inspected page in the internal parameters is "3".

In step S1612, the printing device 101 detects a jam while the third page of paper is being transported, and notifies the inspection unit 106 of the location where the jam has occurred and that the jam has occurred on the third page.

In step S1613, the inspection unit 106 executes steps S506 and S507 of FIG. 5, and notifies the inspection device 108 of the received jam information (step S1501 of FIG. 15).

In step S1614, the inspection device 108 executes steps S408 and S409 of FIG. 4, and suspends the inspection processing (step S1201 of FIG. 12).

In steps S1615 to S1616, the second page of inspected paper is discharged correctly to the exterior of the device, and the discharged page number is written for the discharged page in the internal parameters, in the same manner as in steps S1604 and S1605. It is assumed that at the point in time of step S1616, "2" is written.

In step S1617, when the paper which remained within the device has finished being discharged, the printing device 101 notifies the inspection unit 106 that the transport in the device is complete.

In steps S1618 and S1619, the inspection unit 106 obtains the inspected pages and discharged pages in the internal parameters.

In step S1620, the inspection unit 106 calculates the inspection recovery page in accordance with the obtained discharged pages. Because the next discharged page is the inspection recovery starting page, the discharged page in the internal parameters is incremented by 1 and set to the inspection recovery starting page.

In step S1621, the inspection unit 106 notifies the inspection device 108 of the inspection recovery starting page (step S1506 in FIG. 15).

In step S1622, upon receiving the inspection recovery starting page, the inspection device 108 sets the received inspection recovery starting page in the internal parameters. The sequence then moves to step S508 of FIG. 5.

Through the sequence described above, the inspection recovery starting page can be calculated without using the inspection status management table 800. Accordingly, when a jam has occurred, the inspection can be resumed without burdening an operator with the inputting of a resume position, in the same manner as in the third embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is determined by the scope of the following claims.

This application claims the benefit of Japanese Patent Application No. 2020-097833, filed Jun. 4, 2020, which is hereby incorporated by reference herein in its entirety.

What is claimed is:

1. A printing system comprising a printing apparatus and an inspection apparatus, the inspection apparatus comprising:
at least one processor; and
at least one memory,
wherein when a program stored in the at least one memory is executed by the at least one processor, the program causes the at least one processor to function as:
a receiving unit that receives a scanned image obtained by reading along a conveying path a sheet on which an image has been formed;
an inspection unit that performs inspection of the sheet on which the image has been formed by comparing the scanned image with a reference image; and
a recording unit that records information identifying the discharged sheet and information identifying the inspected sheet in the memory, and
the printing apparatus comprising:
at least one processor; and
at least one memory,
wherein when a program stored in the at least one memory is executed by the at least one processor, the program causes the at least one processor to function as:
a printing unit that forms an image on a sheet transported along the conveying path;
a sheet discharging unit that discharges the inspected sheet from the conveying path; and
a notification unit that notifies the inspection apparatus of information identifying the discharged sheet,
wherein the inspection apparatus determines a page for which the inspection is resumed using the information identifying the inspected sheet and the information identifying the discharged sheet recorded by the recording unit in a case where a jam occurred in the conveying path of the sheet and printing is resumed.

2. The printing system according to claim 1,
wherein the recording unit is configured to record whether or not the sheet has already been inspected and whether or not the sheet has been correctly discharged for each of instances of order information of the sheets.

3. The printing system according to claim 2,
wherein the recording unit is configured to record the order information of the last sheet that has already been inspected and the order information of the last sheet that has been correctly discharged.

4. The printing system according to claim 1,
wherein the scanned image is obtained by capturing an image of the sheet.

5. The printing system according to claim 2,
wherein the order information of sheets that have been inspected and the order information of sheets that have been correctly discharged are recorded by the recording unit.

6. The printing system according to claim 2,
wherein the order information of sheets that have been inspected and the order information of sheets that have been correctly discharged are recorded by the receiving unit.

7. The printing system according to claim 2,
wherein the recording unit is configured to record the order information of the sheets that have been correctly discharged in response to a notification of a discharge made by the printing unit.

8. The printing system according to claim 1,
wherein the inspection unit is configured to inspect a position and a color of an image formed on the sheet.

9. A method of inspecting an image formed on a sheet transported along a transport path performed by a printing apparatus and an inspection apparatus, the method comprising:
receiving, by the inspection apparatus, a scanned image obtained by reading along a conveying path a sheet on which an image has been formed;
performing, by the inspection apparatus, inspection of the sheet on which the image has been formed by comparing the scanned image with a reference image;
recording, by the inspection apparatus, information identifying the discharged sheet and information identifying the inspected sheet in a memory;
forming, by the printing apparatus, an image on a sheet transported along the conveying path;
discharging, by the printing apparatus, the inspected sheet from the conveying path; and
notifying, by the printing apparatus, the inspection apparatus of information identifying the discharged sheets,
wherein the inspection apparatus determines a page for which the inspection is resumed using the information identifying the inspected sheet and the information identifying the discharged sheet recorded in the recording in a case where a jam occurred in the conveying path of the sheet and printing is resumed.

10. A non-transitory computer-readable medium that stores a program that, when executed by a computer, causes the computer to carry out a method of inspecting an image formed on a sheet transported along a transport path, the method comprising:
receiving a scanned image obtained by reading along a conveying path a sheet on which an image has been formed;

performing inspection of the sheet on which the image has been formed by comparing the scanned image with a reference image;

recording information identifying the discharged sheet and information identifying the inspected sheet in a memory;

forming an image on a sheet transported along the conveying path;

discharging the inspected sheet from the conveying path; and notifying an inspection apparatus of information identifying the discharged sheets, wherein a page for which the inspection is resumed is determined using the information identifying the inspected sheet and the information identifying the discharged sheet recorded in the recording in a case where a jam occurred in the conveying path of the sheet and printing is resumed.

11. The printing system according to claim 1, wherein the inspection apparatus further comprises:

a control unit that controls the inspection so that the inspection is resumed from the determined page for which the inspection is resumed.

12. The printing system according to claim 11, wherein the control unit is configured to resume printing from the sheet that has not been discharged in a case where a jam has occurred.

13. The printing system according to claim 1, wherein the printing apparatus further comprises:

a holding unit holds information identifying the discharge sheet notified by the notification unit in association with the information identifying the inspected sheet.

14. The printing system according to claim 1, wherein the notification unit notifies the inspection apparatus of page number information identifying a page of the discharged sheet to be inspected as the information regarding the discharged sheet.

15. The printing system according to claim 1, wherein the notification unit notifies the inspection apparatus of order information indicating the printing order for each sheet where multiple document pages are formed on both sides as the information regarding the discharged sheet.

* * * * *